Jan. 4, 1955   D. D. JONES ET AL   2,698,692
STACKING AND CONVEYING MECHANISM
FOR PACKAGING APPARATUS
Filed May 10, 1949   12 Sheets-Sheet 9
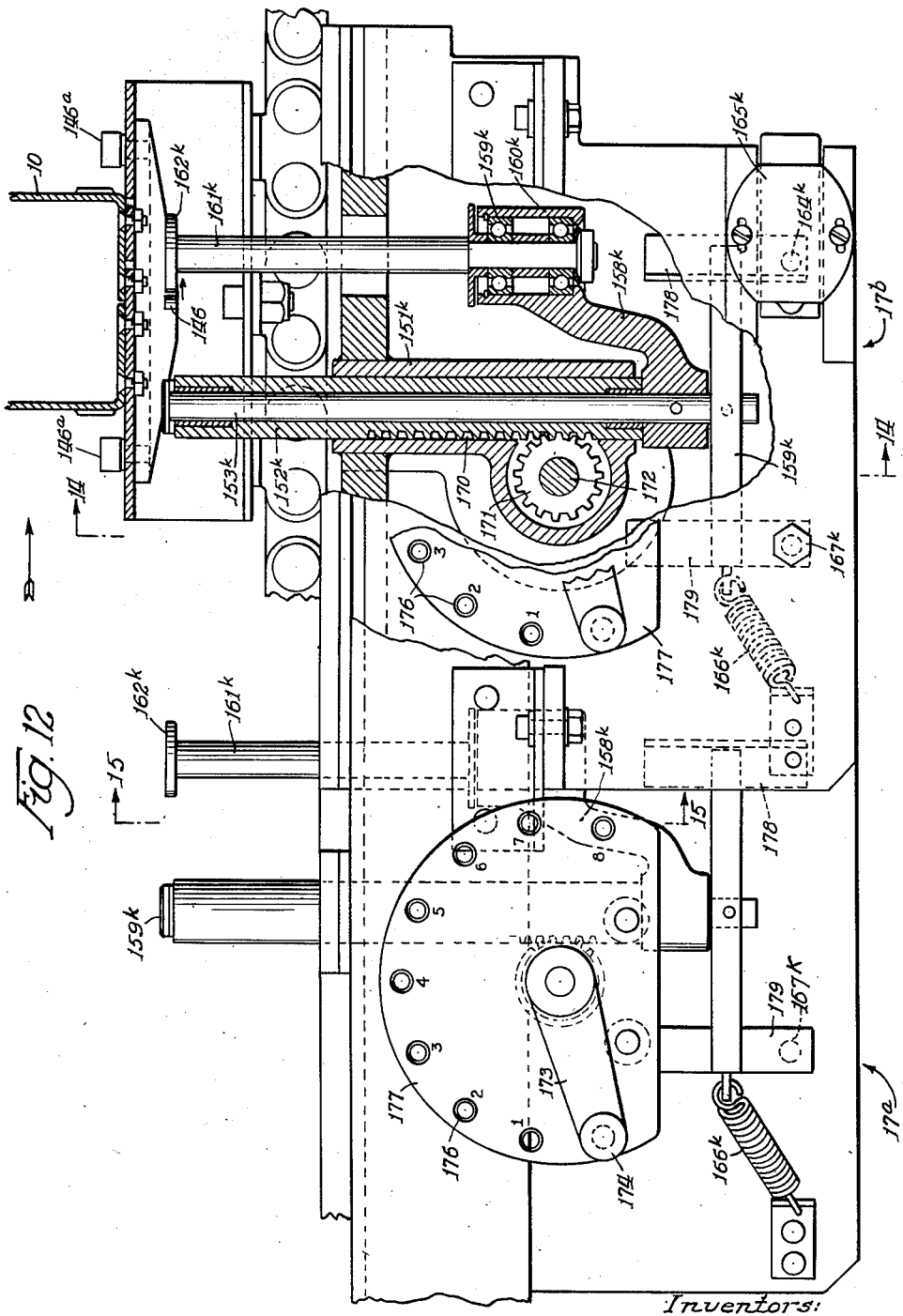
Inventors:
David Day Jones and
Charles Thomas Banks
By: Soans, Pond & Anderson
Attys

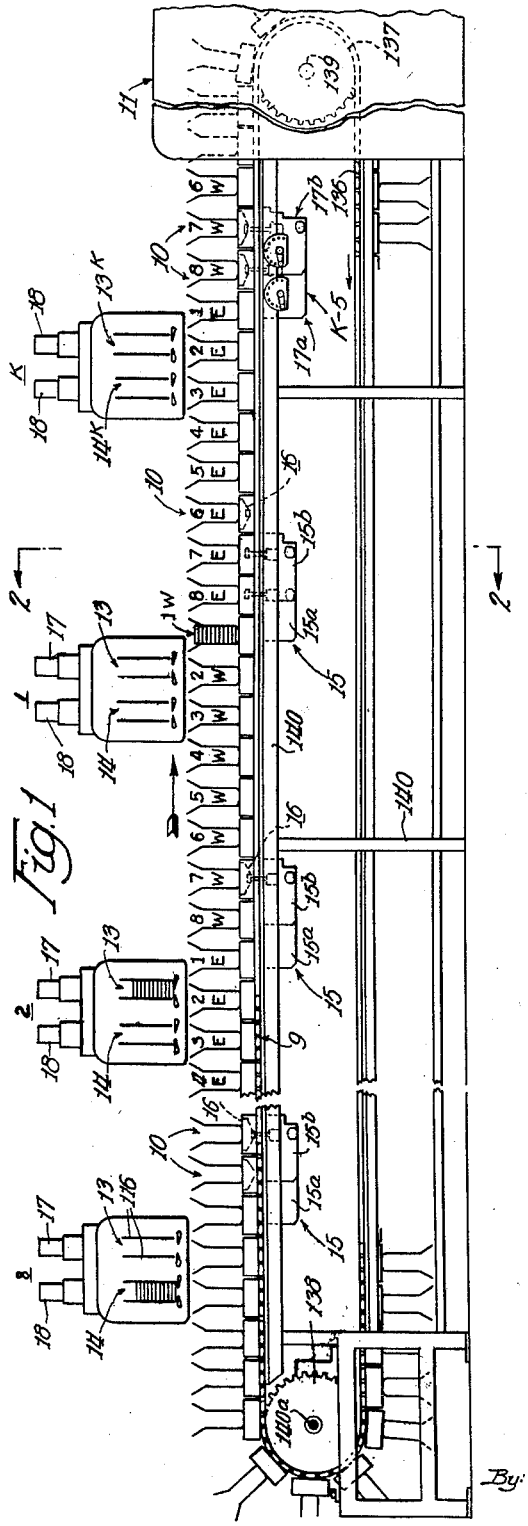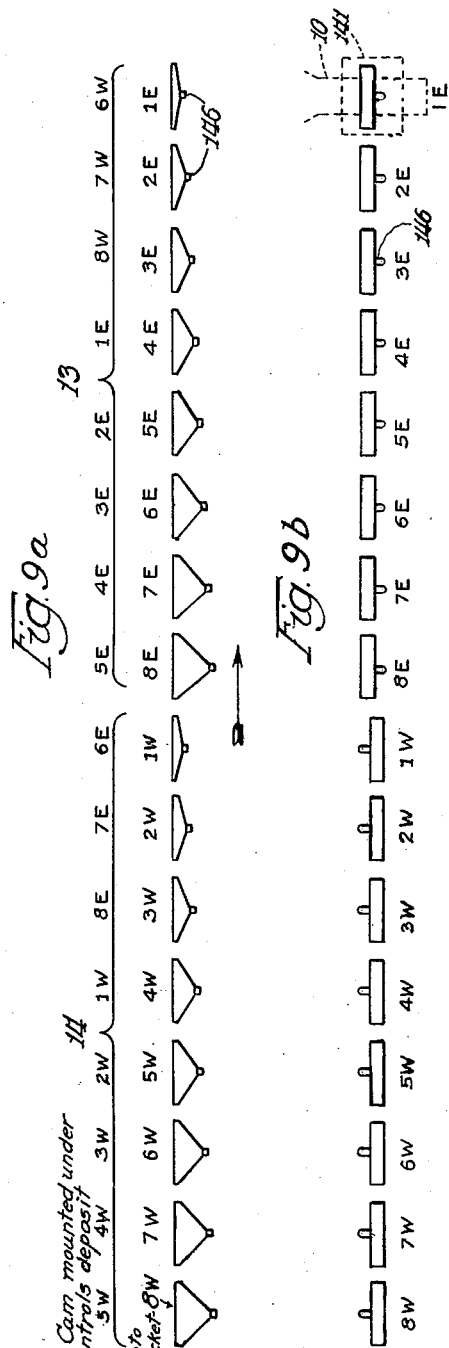

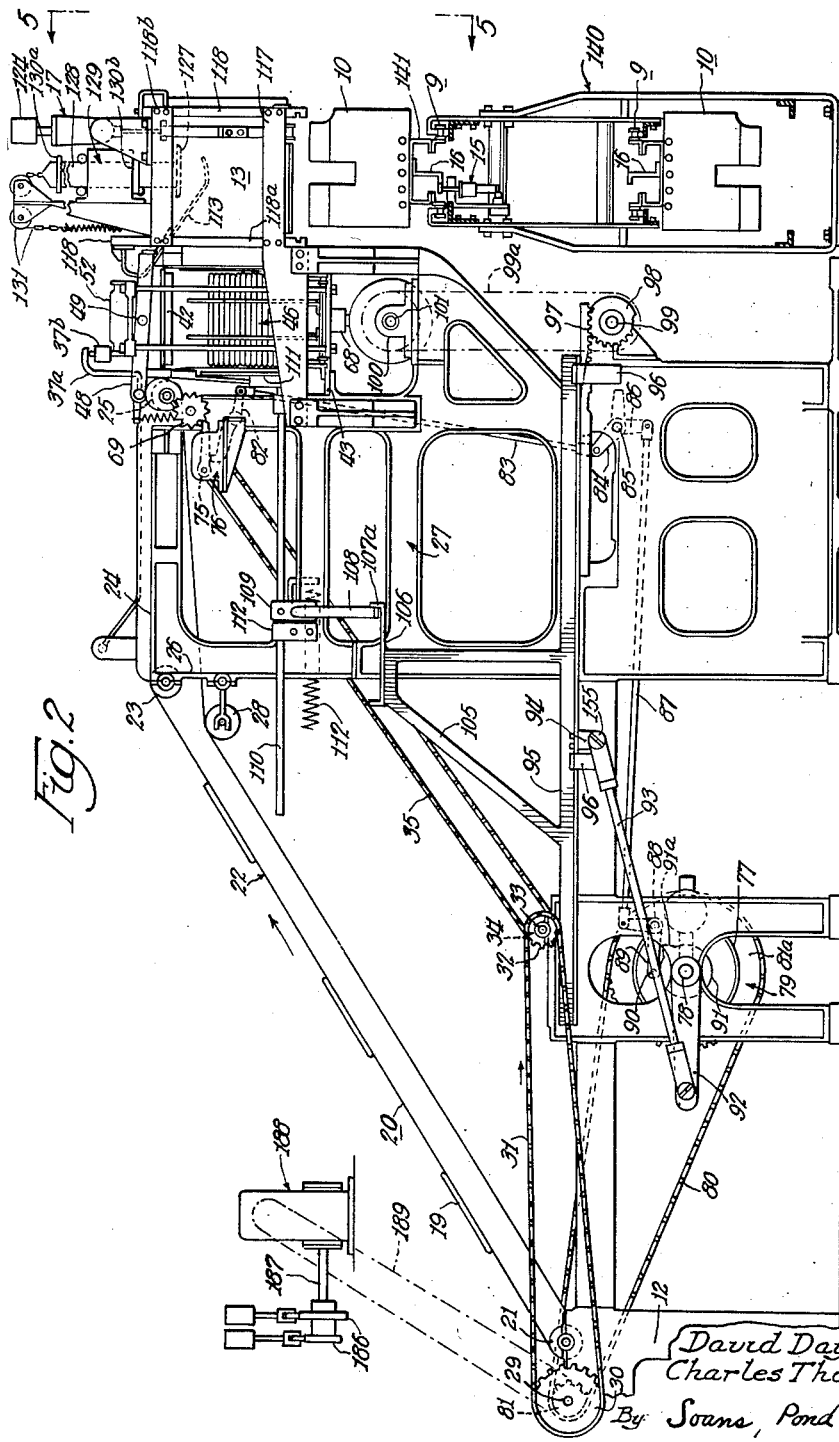

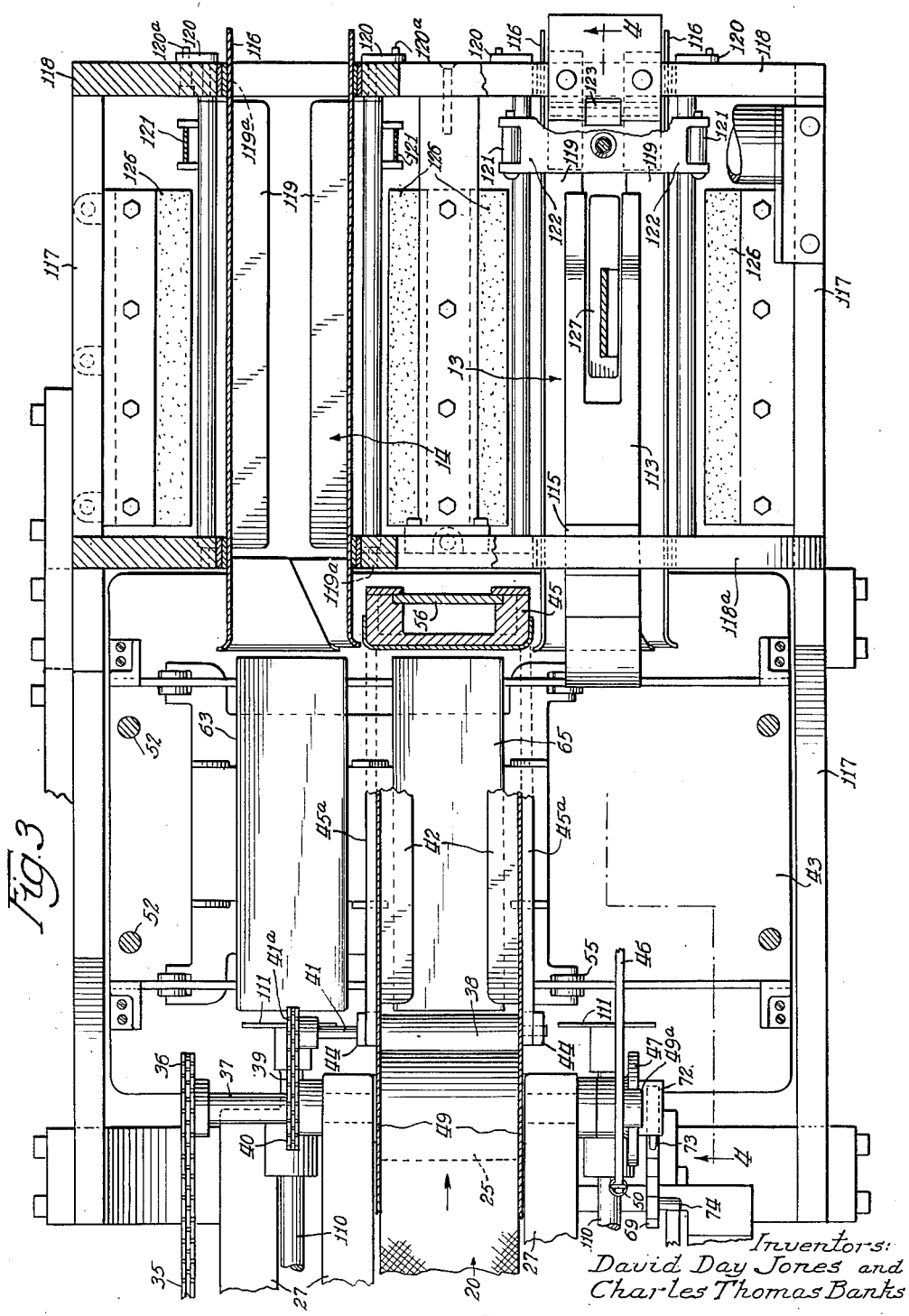

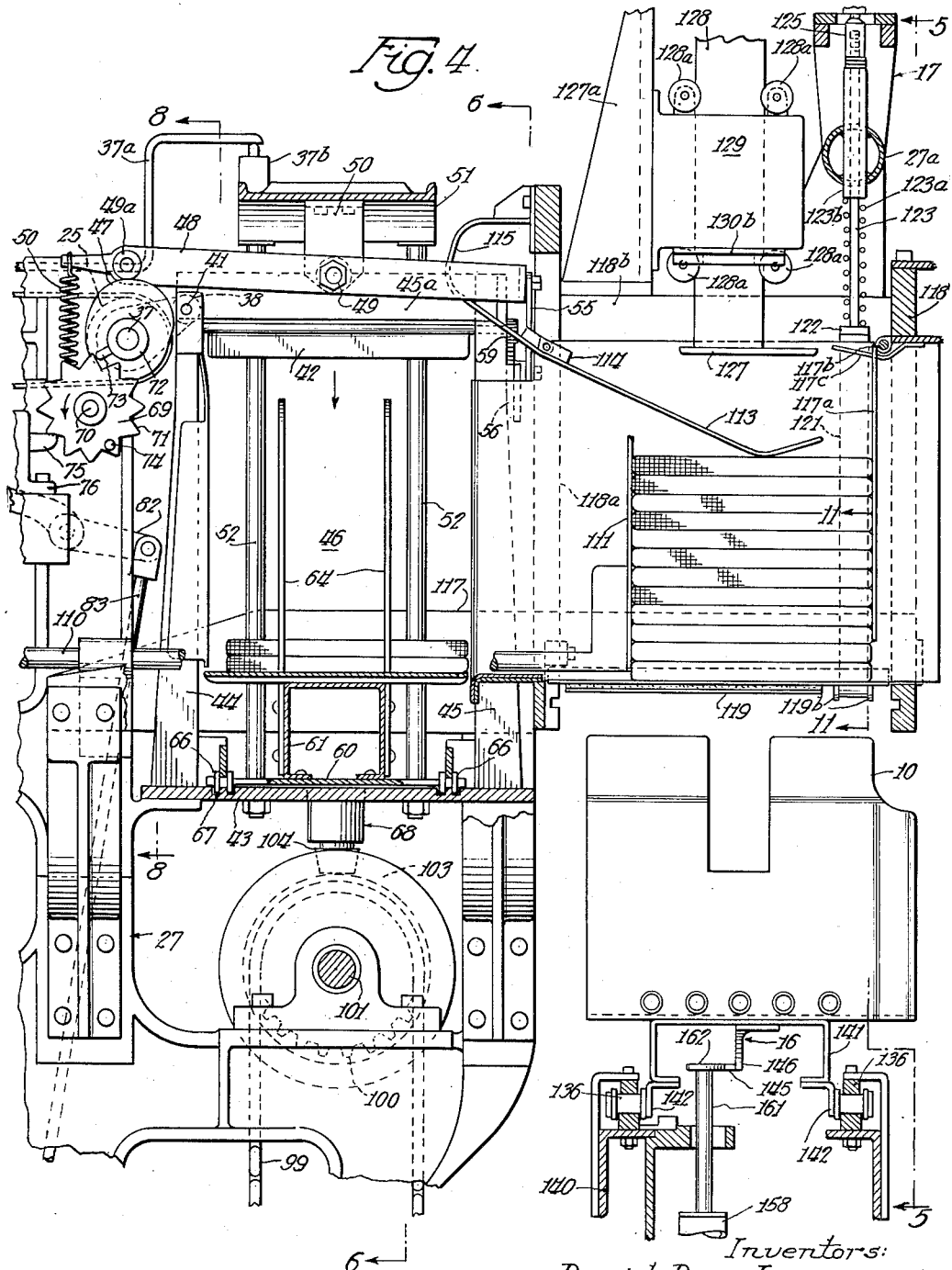

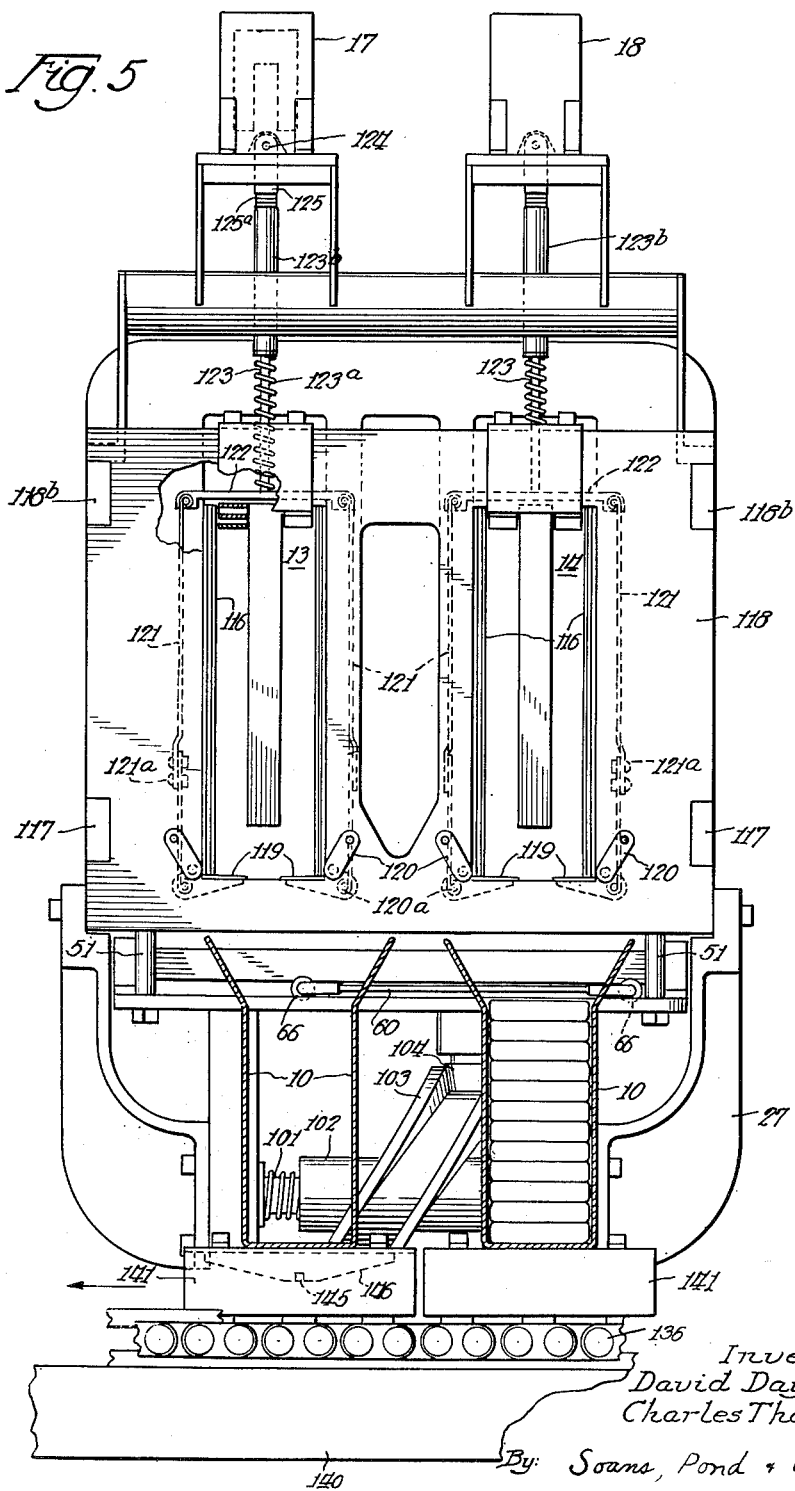

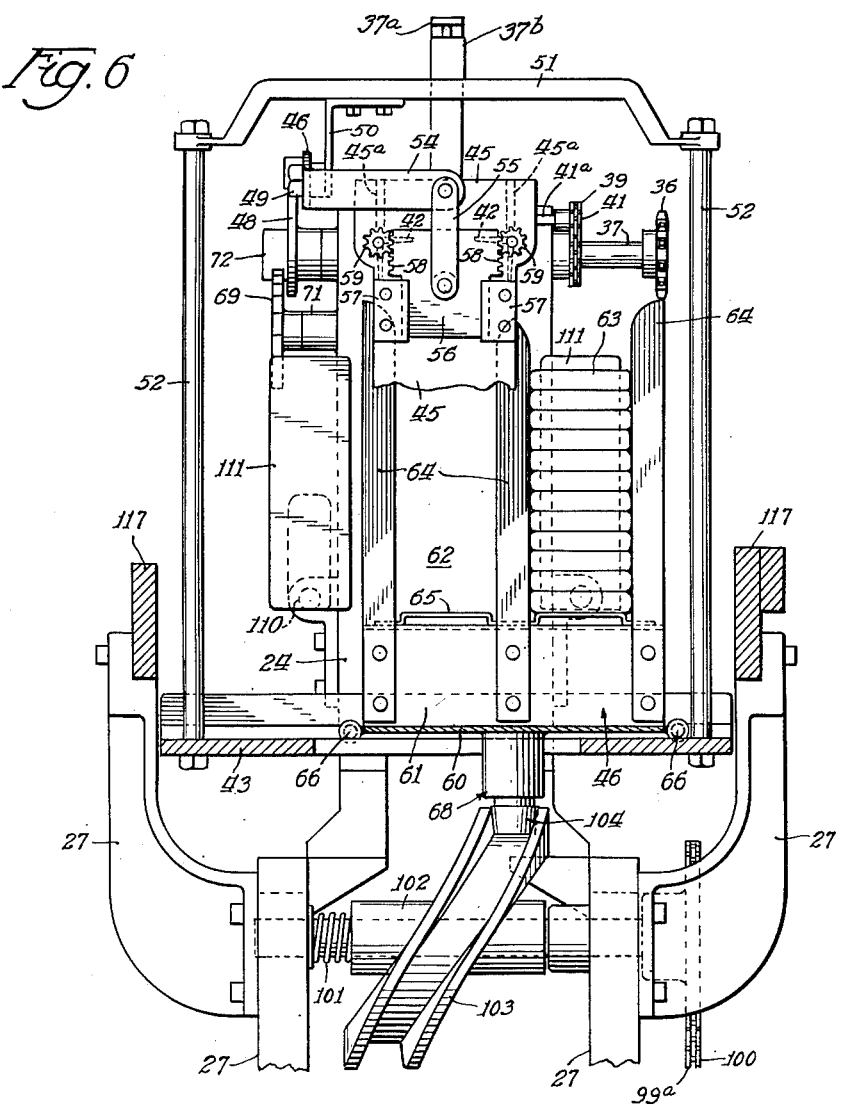

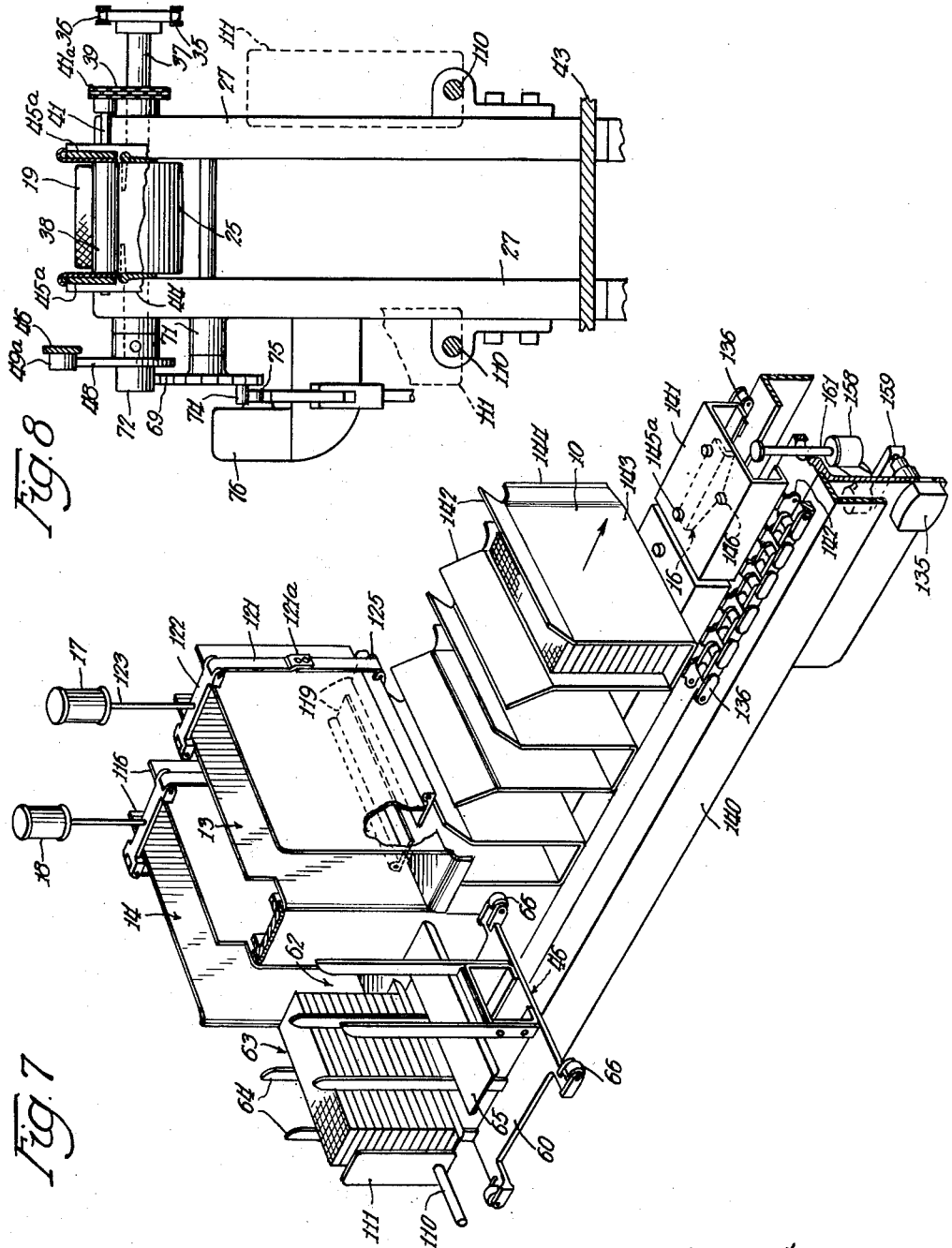

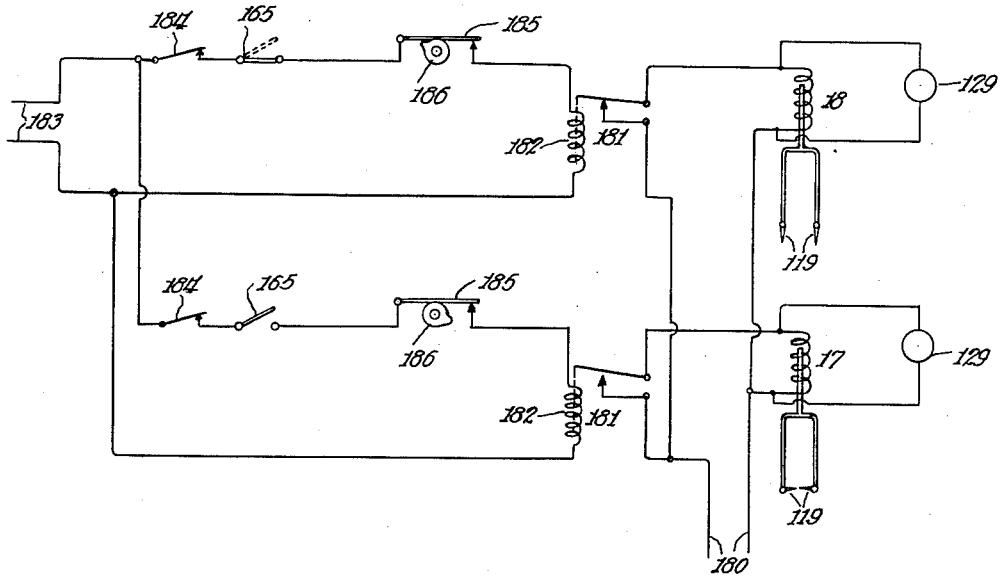
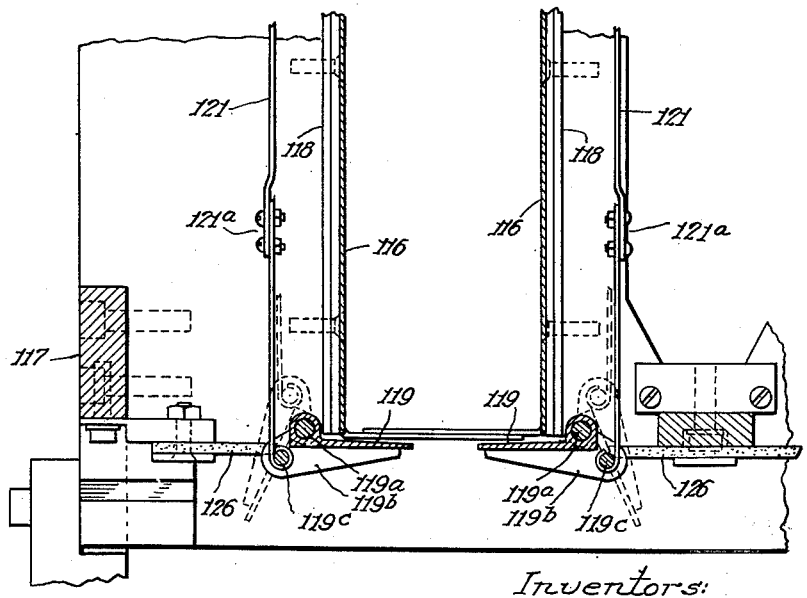

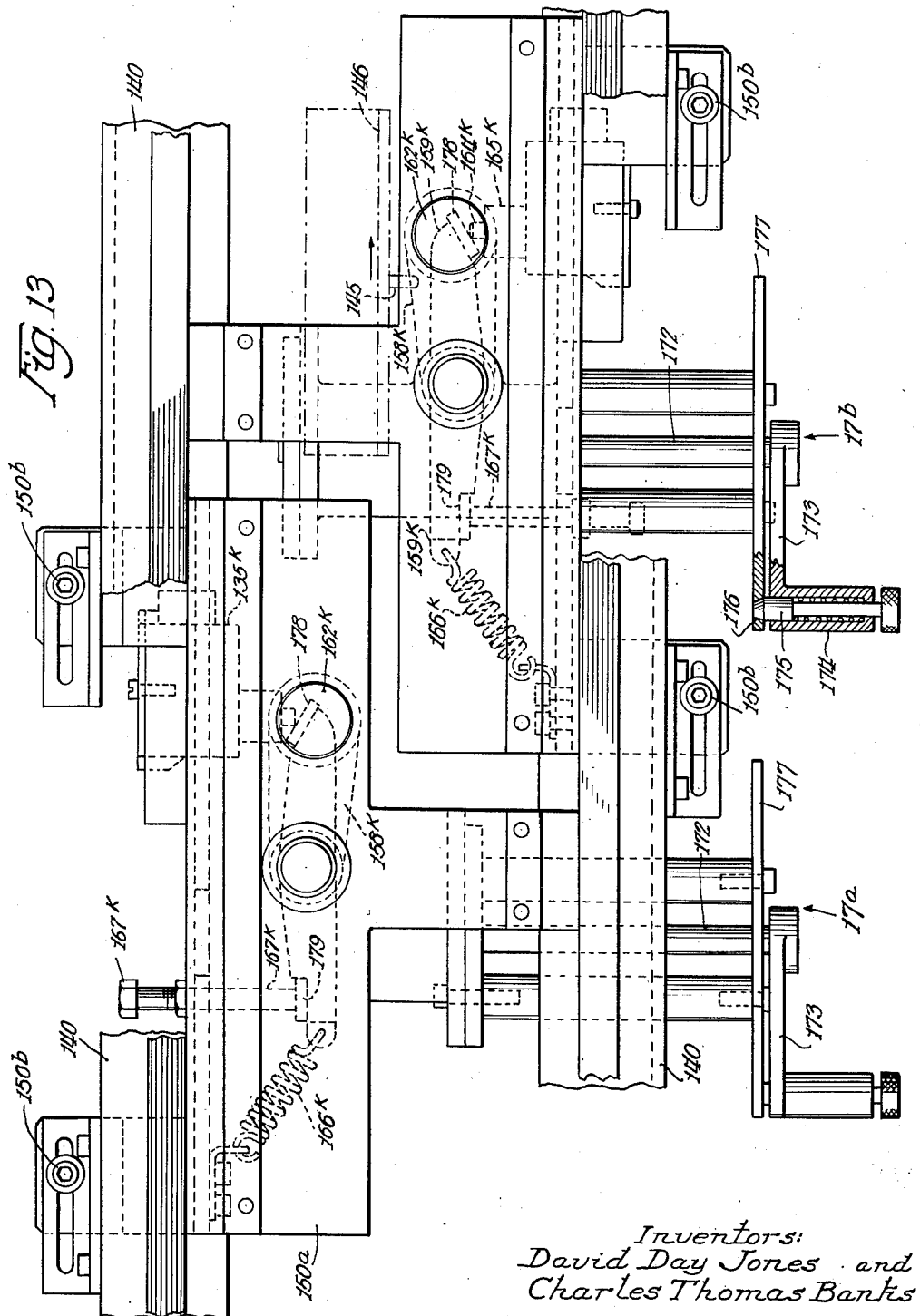

Jan. 4, 1955

D. D. JONES ET AL 2,698,692

STACKING AND CONVEYING MECHANISM
FOR PACKAGING APPARATUS

Filed May 10, 1949

Inventors:
David Day Jones and
Charles Thomas Banks
By: Soans, Pond & Anderson
Attys

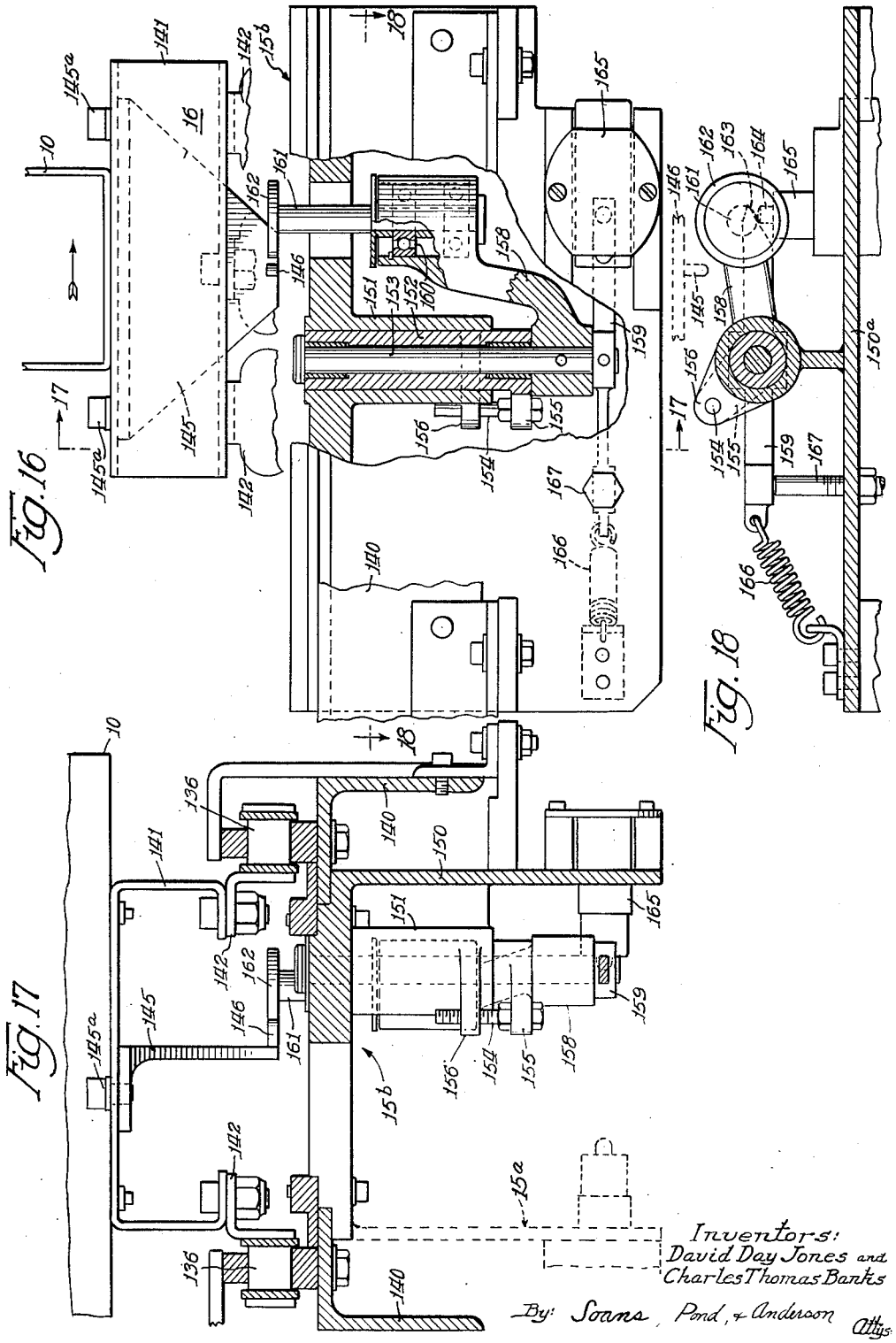

United States Patent Office 2,698,692
Patented Jan. 4, 1955

2,698,692

STACKING AND CONVEYING MECHANISM FOR PACKAGING APPARATUS

David Day Jones, Menasha, and Charles Thomas Banks, Neenah, Wis., assignors, by mesne assignments, to International Cellucotton Products Company, Chicago, Ill., a corporation of Delaware Application May 10, 1949, Serial No. 92,424

21 Claims. (Cl. 214—6)

This invention relates in general to a packaging method and apparatus, and more particularly, to apparatus comprising a plurality of article stacking machines and an associated conveyor which delivers stacks of articles from such plurality of stacking machines to other packaging equipment.

The main objects of the invention are to provide a method and apparatus for economically and expeditiously handling, for packaging purposes, the output of a series of relatively independent, article producing machines; to provide a method and apparatus whereby the articles produced by the several article producing machines may be gathered into stacks of predetermined numbers and then fed in such stacks to mechanism for introducing the stacks into boxes or other containers; to provide a method and apparatus for the aforesaid purposes, which will efficiently handle various kinds of articles but more particularly articles of a soft, compressible and limp nature, such as sanitary napkins, cleansing tissues or other stacked articles, and which is especially adapted to handle articles which are light in weight and of considerable bulk; and to provide apparatus of the type described which is automatic, rapid, positive and efficient in operation, and which will perform its operations without impairing the cleanliness of the product handled so that products, such as sanitary napkins, will be delivered to the boxing equipment in substantially their initial sanitary condition.

Other objects of the invention will be understood by reference to the following specification and accompanying drawings (12 sheets) in which there is illustrated a selected form of mechanism for effecting the grouping and delivery of sanitary napkins to packaging equipment.

In the drawings:

Fig. 1 is a side view of the conveyor section adapted to receive stacks of sanitary napkins as delivered by the associated group of stacking machines;

Fig. 2 is a side elevation of an article stacking machine unit of the apparatus;

Fig. 3 is a top plan view of a portion of the stacking machine unit, certain parts being, however, shown in section to more clearly illustrate the construction thereof;

Fig. 4 is a section approximately as indicated by the line 4—4 on Fig. 3;

Figure 14:
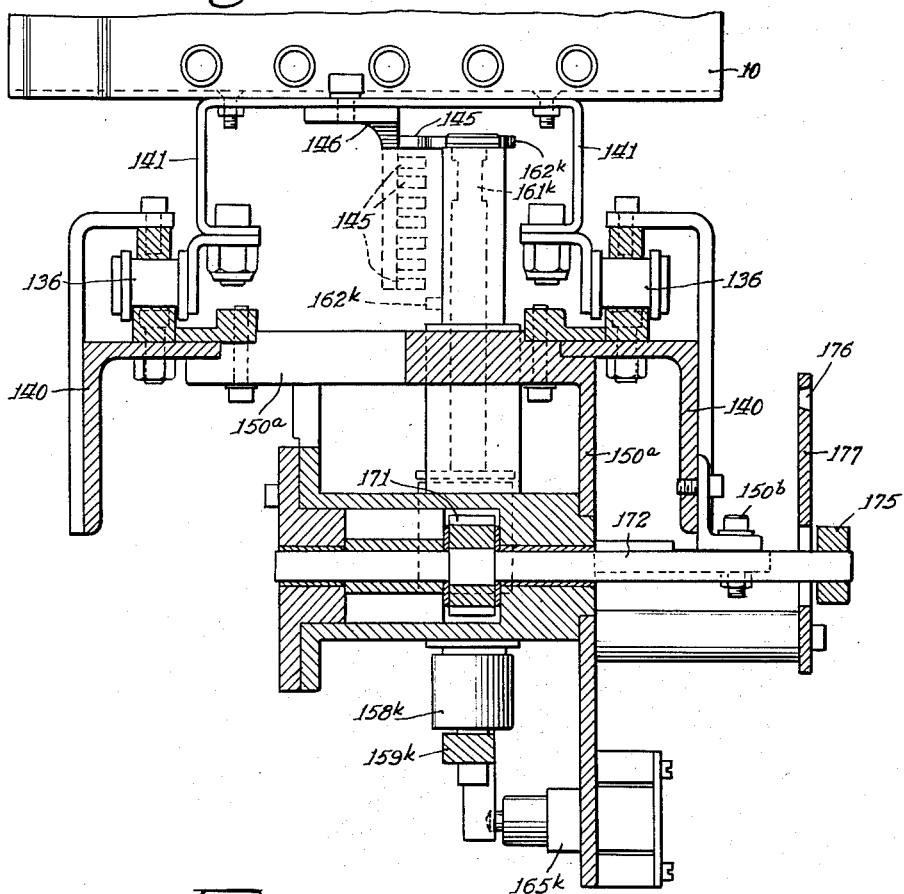
Figure 15:
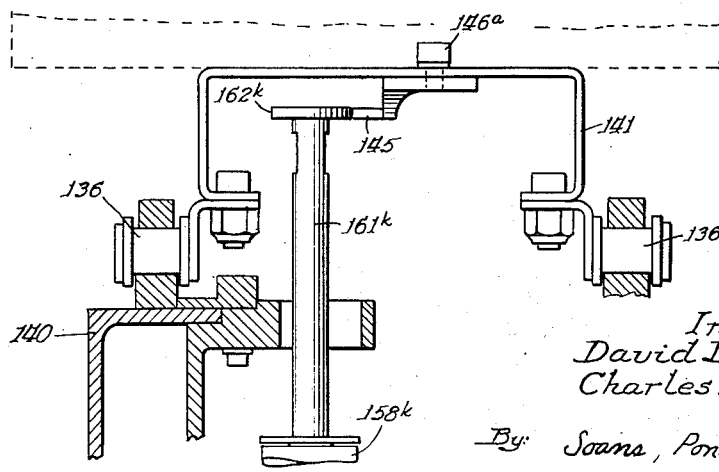

Figs. 5 and 6 are sectional views respectively on the lines 5—5 and 6—6 of Fig. 4;

Fig. 7 is a perspective view of a portion of the apparatus;

Fig. 8 is a section taken along the lines 8—8 of Fig. 4;

Figs. 9a and 9b (appearing under Fig. 1) are more or less schematic side elevation and top plan views respectively of a series of control cams;

Fig. 10 is a schematic illustration of an electrical control circuit;

Fig. 11 is a section on the line 11—11 of Fig. 4;

Fig. 12 is an enlargement of a portion of Fig. 1, certain parts being shown in section;

Fig. 13 is a top plan view of the mechanism illustrated in Fig. 12;

Figs. 14 and 15 are sections respectively on the lines 14—14 and 15—15 of Fig. 12;

Fig. 16 is an enlargement of another portion of Fig. 1, certain parts being shown in section; and Figs. 17 and 18 are sections taken on the lines 17—17 and 18—18 of Fig. 16.

The general arrangement and functioning of the stacking machines and associated conveyor unit may be best understood by reference to Figs. 1 and 2 of the drawings.

As shown there, the arrangement comprises in this instance, a group of eight stacking machines, 1 to 8 inclusive (machines 3 to 7 are not shown but are located intermediate machines 2 and 8), and a stand-by or so called "Key" machine K. The number of machines in each arrangement may, of course, be varied as desired. These machines are disposed in alignment along one side of a continuously operated, horizontal conveyor 9, each of the aligned stacking machines being operative to deposit stacks of articles into individual buckets or receivers 10 carried by the conveyor 9. The conveyor 9 delivers the stacked articles to suitable packaging apparatus 11.

Each of the said stacking machines is of the general character shown in the Thompson Patent 1,708,686; each machine receives and stacks sanitary napkins in groups or stacks of a predetermined number, temporarily places such counted groups alternately in one of a pair of storage compartments 13 and 14, and delivers such stored groups to certain assigned conveyor buckets 10 as they pass thereunder. Each stacking machine, 1-8 inclusive and K, includes a pair of storage compartments 13, 14 to facilitate the continuous counting and grouping of the incoming articles, one of the compartments being operative to temporarily store a stacked group and to deliver the same to the conveyor 9 while the other compartment is accumulating another group. In this manner continuous and uninterrupted stacking of articles is efficiently accomplished at high speeds.

The release of the stored articles by each storage compartment into the bucket on the conveyor which is assigned thereto is accomplished by electrically controlled mechanism which comprises a separate conveyor controlled switch 15 for each storage compartment. A conveyor controlled switch unit K5 is provided for similarly actuating the stacking machine K. Each switch unit embodies a pair of electrical switches, and switches are actuated by means of trigger cams 16, there being one such trigger cam associated with bucket 10. These trigger cams are so arranged that each one actuates a predetermined switch of a predetermined switch unit to thereby effect discharge of a stack of articles from a predetermined compartment 13 or 14 of a predetermined stacking machine to a predetermined bucket. The stacking machines comprise solenoid mechanisms 17 and 18 respectively associated with the storage chambers 13 and 14, the said solenoid mechanisms being controlled by the switch units 15 to release the contents of the associated compartments into the preselected buckets as already indicated.

As shown in Fig. 2, the receiving end of each of the stacking machines, 1-8 inclusive, is disposed in communicating relation with the delivery end of a sanitary napkin end tab folding machine 12 of any suitable form. The sanitary napkins 19 are received from the folding machine 12 on a conveyor 20 which travels about a receiving end roller 21 and extends upwardly as indicated at 22, over a guide roller 23 and thence horizontally, as indicated at 24 and around a discharge end roller 25. The rollers 23 and 25 are journalled in bearings carried by vertical members 26 of a supporting frame structure. From the roller 25, the belt returns over a guide roller 28 to the roller 21.

A shoe 37a (Fig. 2) is hingedly disposed above the horizontal reach 24 of the conveyor belt 20, the free end portion of said shoe being operatively associated with a micro-switch 37b. The weight of the shoe is operative to normally maintain the contacts of the micro-switch 37b closed to complete a portion of the electrical circuit which furnishes power to operate the machine. In the event of accidental accumulation of napkins, one over another, on the conveyor belt, the shoe 37a will be raised upwardly by such accumulated napkins and the contacts on the micro-switch 37b permitted to open and break the operating circuit for the stacking machine.

A continuously driven shaft 29, which is a part of the pad folding machine 12, mounts a sprocket 30 which drives a chain 31 which is trained around a sprocket 32 on a shaft 33, to drive the latter. Another sprocket 34 on shaft 33 drives a chain 35 and a sprocket 36 (Fig. 3) on the shaft 37 which carries the aforesaid pulley 25, whereby said pulley 25 and belt 20 are continuously driven. The articles 19 are thus carried upward and forwardly to the discharge end of the conveyor which discharges the napkins over a roller 38 (Fig. 4). The roller 38 is mounted on a shaft 41 and said shaft is driven at high speed as aforesaid by a chain 39 (Fig. 3) which engages a driving sprocket 40 and the driven pulley shaft 37 and a sprocket 41a on the shaft 41. Roller 38 is thus rotated at a higher peripheral speed than the speed of travel of the belt 20 so as to impart sufficient momentum to the article to effect its unsupported and free travel or flight to a position clear of said roller 38 to permit the article to descend vertically in stacking position.

The napkins impulsively urged forwardly by the roller 38 momentarily come to rest in a horizontal, flatwise position on a pair of gates 42 (Figs. 3, 4 and 6) which are disposed forwardly of the high speed roller 38. A frame supported bed plate 43 (Figs. 2, 4, and 6) mounts a cage-like structure comprising upwardly extending members 44 and 45 and a pair of spacer bars or links 45a which interconnect the upper ends of said uprights 44 and 45. The inner faces of these spacers 45a and of the upwardly extending members 45 serve as guide means for positioning the napkins on the gates 42 so that they will be properly positioned above a receiving receptacle 46 located beneath the gate members 42. The gate members 42, as shown in Fig. 3, are pivotally mounted on the inner and outer guide members 44 and 45. Suitable tripping means are provided for intermittently swinging the gates about these pivot points to allow the napkins successively positioned on said gates, to pass downwardly into the receiving receptacle 46.

The tripping means last referred to, comprises (Fig. 4) a cam 47 mounted on the end of the conveyor roller shaft 37. The shaft 37 and cam 47 are rotated at the rate of one revolution for each pad received to cause associated linkage to operate the pivoted gates 42 a short interval after the placement of a napkin thereon. The linkage extending between the gates 42 and the cam 47 comprises an arm 48 pivotally mounted at 49 intermediate its ends and having one end provided with a roller 49a maintained in constant contact with the continuously rotating cam 47 by means of a spring 50 stretched between an extension of the arm and a part of the supporting frame. The pivot 49 is supported by a bracket 50 depending from a bridge member 51 which is mounted on the upper ends of posts 52 extending upwardly from the bed plate 43.

The forward end portion 54 of the arm 48 is bent inwardly of the machine (Fig. 6) and is connected by a link 55, to a vertically, slidably mounted, cross plate 56. Suitable guideways 57 mounted on the upper end of upright 45 cause rack bars 58 formed on the opposite sides of the cross plate 56 to be maintained in operative engagement with a pair of gear wheels 59 attached to the supporting shafts of the drop gates 42. When the cam 47 effects lowering of the forward end 54 of the arm 48, the rack bars 58 will rotate the gears 59 so as to cause the gate members 42 to swing downwardly and allow the napkin resting thereon to drop into the receptacle 46. Napkins successively deposited on the gates 42 and thereby dropped into said receptacle will, of course, be stacked in an even, vertical stack which may subsequently be handled as a unit.

The receiving receptacle 46 (Figs. 3, 6, and 7) is a two-compartment structure which comprises a horizontal carriage plate 60 having mounted thereon a rectangular base member 61. A series of six arms or strap-like posts 64 extend upwardly from said base member, three on each side thereof, so as to divide said receptacle 46 into two separate compartments or magazines 62 and 63 which alternately receive the napkins dropped from the gates 42. The arms 64 are positioned in a spaced-apart relation on each side of said base a distance equivalent to the width of the napkins in a flatwise position and extend upwardly to a height sufficient to accommodate a stack of the desired number of napkins. A platform 65 mounted on the base 61 provides bottoms for the compartment 62 and 63 to support napkins in said compartments.

The receptacle 46 is reciprocally mounted crosswise of the direction of travel of the napkins and conveyor 22, so as to alternately align the compartments with the discharge end of said conveyor and the drop gates 42. To that end, a pair of rollers 66 are mounted on the bottom of the receptacle carriage plate 60 and said rollers engage tracks or guideways 67 in the bed plate 43. Suitable actuating means 68 mounted on the underside of the receptacle carriage plate reciprocates the receptacle 46 so as to alternately position the compartments as aforesaid. When magazine 62 is in alignment with the drop gates 42, magazine 63 is in alignment with its associated storage compartment 14 for transfer of the articles from said magazine 63 into said storage compartment 14. During that time, the other magazine 62 is in alignment with the gates 42 and will be filled with the predetermined number of articles, whereupon the receptacle 46 is automatically operated to bring the filled magazine 62 into alignment with its associated storage compartment 13 and the empty compartment 63 into alignment with the drop gate 42.

The automatic movement of the receptacle 46 is controlled by mechanisms comprising a star wheel 69 (having a series of teeth 71 located on its outer periphery) mounted on a shaft 70 which projects from a portion of the frame 27. The number of teeth 71 on the star wheel corresponds to the number of articles which are to be placed in each of the counted stacks. A small collar 72 mounted on the outer end of the conveyor upper roller shaft 37 carries a radially outward extending stud or pin 73 which is so arranged that in each revolution of the conveyor roller shaft 37, said stud will engage a tooth of the star wheel. The pin 73 in its engagement with the tooth section of the star wheel 69 will cause the wheel to move one step in a counter-clockwise direction, (as viewed in Fig. 4) that is, to rotate a circumferential distance which is equivalent to the distance between the adjacent teeth centers.

Since the conveyor roller shaft 37 completes one revolution for each napkin which is deposited on the gate members, the star wheel 69 will be moved one notch each time that a napkin 19 is fed to the aligned compartment of receptacle 46. When twelve napkins have been deposited within the aligned magazine of the receptacle 46, the star wheel 69 will have been moved twelve steps and a laterally projecting pin 74 on said star wheel will be moved into engagement with an operating arm 75 on an electric switch 76 so as to close an electrical circuit for energizing a magnetic clutch 77 (Fig. 2). A clutch wheel 79, loosely mounted on shaft 78, is continuously operated by a driving chain 80 and sprocket 81a attached to or forming a part of the clutch wheel 79. The driven part of the magnetic clutch 77 is permanently attached to the shaft 78 and when the clutch is energized, the shaft 78 will be driven.

The shaft 78 has secured to it, a crank 92 to the free end of which there is pivoted an end of an adjustable link or connecting rod 93. The other end of the connecting rod 93 is pivotally connected to a bracket 94 which depends from the underside of a longitudinally slidable T-rail 95. The rail 95 is slidably mounted on the supporting frame 27 by suitable means indicated at 96 and is adapted to be reciprocated responsive to the movement of shaft 78 and the interconnecting members 92 and 93. A rack member 97 is fixedly attached to the forward end of the T-rail 95 and engages a gear member 98 which is mounted on a shaft 99 which is journalled to the frame of the machine. By forward movement of the rail 95 and the rack 97, the gear segment 98 and shaft 99 are rotated in a clockwise direction, such rotation being transferred via a chain and sprocket linkage 99a to a sprocket 100 (Figs. 4 and 6) and a shaft 101 on which said sprocket 100 is mounted. The shaft 101 is suitably journalled in the machine frame and carries a rotary cam 102, having a continuous cam groove 103 for operating a roller 104 which is rotatively secured to the bottom of the receptacle carriage plate 60. The cam 102 is moved through one-half revolution responsive to each energization of the magnetic clutch circuit to thereby cause the receptacle to be shifted laterally in the manner previously described.

For limiting the rotation of the cam 103 to one-half a revolution for each complete revolution of the counting wheel 69, the following mechanism is provided. Movement of the switch arm 75 in a downward direction to energize the magnetic clutch 77 simultaneously effects rocking in a clockwise direction of an arm 82 which is pivotally mounted intermediate its ends on the frame structure (Figs. 2 and 4). A rod 83, pivoted to and extending downwardly from said arm 82, has its lower end connected to an arm 84 of a bell crank 85. An arm 86 of said bell crank is connected by means of a rearwardly extending connecting rod 87 to a pivotally mounted bell crank 88. An arm 89 of the last mentioned bell crank carries a laterally projecting pin or stud 90. Said stud 90 is movable toward and from the periphery of a cam disc 91 carried by the magnetic clutch controlled shaft 78 on the driven part of the magnetic clutch 77 by a cam projection 91a on said cam disc 91. After one revolution of the clutch wheel 79, detent 91 will engage the stud 90 to move same upwardly out of the detent travel path. Upward movement of the stud 90 will cause the lever 82 to rock in such a manner as to lift the switch arm 75 to open the energizing circuit to the magnetic clutch 77 whereby rotation of shaft 78 is stopped upon the completion of one rotation. Suitable braking equipment, not shown, is employed with the clutch and shaft assembly to quickly stop rotation of the shaft after the clutch energizing circuit has been opened.

Operation of the switch arm 75 of the star wheel 69 after a dozen napkins have been placed in one of the compartments, results in energization of the magnetic clutch 77, one full revolution of the shaft 78 and crank arm 92, and to and fro movement of the slide bars 95 and 97. Forward movement of the rack is transmitted to the shaft 99 and thence to the cam 102. However, the gear 98 is connected to the shaft 99 through the agency of a suitable one way clutch so that upon rearward movement of the rack 97, the gear 98 will rotate freely in the shaft so that said shaft and the cam 102 remain stationary.

Immediately after each lateral movement of the receptacle 46, suitable pushers are operated to move the stacked napkins from the respective compartments of the receptacle into the storage chambers 13 and 14 associated with said compartments 62 and 63 respectively. To that end, an upstanding bracket member 105 (see Fig. 2) is attached to the T-rail 95 and provided with a U-shaped member 106 having vertical arms or legs 107 and 107a. The vertical legs 107 and 107a are engageable with an arm 108 which is rigid with and depends from a cross head 109 which is fixedly secured to a pair of horizontally spaced, slidably mounted pusher rods 110. The pusher heads 111 (see Fig. 3) are attached to the forward ends of the rods 110. One of the pusher rods and heads is aligned with the positions of the compartment 62 when the compartment 63 is in article receiving position under the drop gates 42, and the other pusher rod or head is aligned with the position of the compartment 63 when the compartment 62 is in such article receiving position.

During the first position of the forward movement of the T-rail 95, the receptacle 46 is moved as aforesaid and the leg 107 approaches the arm 108. During the succeeding portion of said forward movement of the rail, the leg 107 will act through the arm 108 to advance said pusher rods 110 to thereby eject the stack of articles from the compartment 62 or 63 which is in alignment with one of said pushers. During the article ejecting operation the cam 103 holds the receptacle 46 stationary, rotation of the cam being automatically terminated after one-half of a revolution, by disengagement of the rack bar 97 from the gear segment 98 in an arrangement substantially described in said Patent 1,708,686. Said arrangement includes means for effecting reengagement of the rack bar and gear segment upon return of the rack bar to the starting position. During the operative movement of one of said pushers, the other pusher moves idly through space adjacent the outside of the receptacle then in article receiving position.

The plunger 110 is normally disposed rearwardly of the receptacle line of travel. Suitable spring means 112 stretched between a portion of the cross head member 109 and a frame part, are effective to return the plungers 110 to their retracted position as the T-rail 95 is moved rearwardly. In the event of the failure of spring 112, leg 107a of the U-shaped member 106 will engage the arm 108, as the T-rail returns to its normal retracted position to move the plunger 110 out of the path of travel of the receptacle 46.

As the stack of napkins is moved into the storage compartment 13 or 14 by a pusher 110 (Figs. 3 and 4) a hinged band or strap 113 will be vertically displaced by the napkin stack. Only light compressive force is exerted upon the napkin stack by said strap 113 to prevent upward displacement of the napkins as they enter said compartments and to prevent tipping of said stacks in the direction in which they move into the respective compartments. The strap 113, of which there is one in each of said compartments, is hinged as shown at 114 to a support 115 which is secured to an upper frame cross member as best shown in Figs. 3 and 4. A light spring may be interconnected between the frame and the strap end to impart a slight pressure to the napkin stacks to accelerate delivery thereof from the compartments into the assigned buckets.

Each of the storage compartments 13 and 14 comprise a pair of vertical, sheet metal side walls 116 (Figs. 3, 4, 7 and 11) which are adjustably attached to a framework comprising horizontal supporting members 117 (Fig. 2), extending forwardly from the main frame structure 27 and attached front and rear vertical supporting members 118 and 118a. These latter members are interconnected adjacent their upper ends by horizontal frame bars 118b, and the vertical walls 116 are fastened to the vertical support members so arranged. The forward edges of the movable receptacle 46 are arranged in spaced relation with the rearward ends of the compartments 13 and 14 to allow said receptacle to move crosswise of said compartments, the latter being so positioned as to be in longitudinal alignment with the discharge positions of respective magazines 62 and 63 of said receptacle.

A plate 117a extends over the forward end of each compartment 13 and 14 to limit the movement of the napkin stack responsive to the forward movement of pushers 110. Said plates 117a depend from hinges or pivots 117b (Figs. 4 and 5) mounted on the vertical front frame member 118. Guards 117c are mounted on the frame adjacent the hinged ends of the said holdback plates 117a to prevent entanglement of articles delivered into the compartments, with the hinge structure 117b and other adjacent elements.

A pair of drop gates 119 are hinged to the bottom of each compartment. These gates are operative to receive and support the napkin stacks delivered into the overlying compartments, and said gates may be rocked to an open position for dropping the napkin stacks into buckets on the conveyor 9 which travels under the said compartments.

The gates 119 are pivotally supported by pivot shafts 119a which extend through bearing openings formed in the outer marginal portions of the gates which rock on said shafts (see Figs. 3 and 11). Said shafts 119a are longitudinally slidable through said bearing openings, and end portions of these shafts are seated in openings in the vertical frame members 118 and 118a. The outer or forward ends of said shafts 119a have rigidly united thereto, laterally extending arms 120 which are provided with openings to receive suitable pins 120a which project from the vertical supporting member 118. By this means the pivot shafts 119a are held against rotation. Endwise displacement of the pivot shafts 119a may be prevented by inserting a readily removable cotter pin through the outer end of the pin 120a so as to prevent movement of the arm 120 off the pin. By removing such cotter pin the pivot shaft 119a may be withdrawn endwise to thereby permit removal of the corresponding gate 119a and its quick replacement with another gate should occasion require. This readily demountable gate arrangement facilitates the changing of gates very quickly from the forward end of the machine and without requiring stopping of the conveyor 9 and the other machines which deliver articles to said conveyor.

The gates 119 for each compartment 13 and 14, are operated by the associated solenoids 17 and 18. For that purpose each gate 119 has secured to it a pair of arms 119b (Figs. 4 and 11), which are rotatably supported by a cross pin 119c in spaced relation to the axis of the pivot pin 119a of the gate. Metal straps 121 are secured at their lower ends to the cross pins 119b and extend upwards and have their upper ends secured to the ends of a crossarm 122 (see Figs. 3 and 5). The cross-arms 122 are provided with upwardly extending rods 123, these rods being rigid with the cross-arms at about their horizontal centers, and the upper end of each of said rods 123 has secured thereto a clevis or similar connector which is pivoted as shown at 124 to the core or armature of the solenoid 17 or 18. When the solenoid is energized, the armature thereof is moved upwardly to effect upward movement of the rod 123 and cross-arm 122. Such upward movement of the cross-arm is transmitted through the straps 121 to the gates 119 at the bottom of the compartment and causes opening movement of the gates 119 from the closed position shown in full lines in Fig. 11, to the open position illustrated in dotted lines in that figure.

Opening movement of the gates 119 is limited by engagement thereof with bumpers 126 of non-metallic material, said bumpers being suitably mounted in fixed position on the supporting frame structure. By employing non-metallic bumpers, which may also be slightly resilient, excessive noise is avoided in the operation of the mechanism and breakage of the metal gates due to metal fatigue is substantially reduced.

Closing movement of the gates 119 is effected by means of springs 123a disposed around the rods 123 and confined between the respective cross members 122 and the lower ends of guide tubes or sleeves 123b (see Figs. 4 and 5), which are rigidly secured in a fixed tubular, frame cross member 27a. Upon upward movement of the cross member 122 for opening the gates 119, the spring 123a will be compressed. Upon deenergization of the actuating solenoid, the expansive force of the spring 123a will, of course, effect downward movement of the parts to close the gates. The straps 121 which interconnect the cross members 122 and the gates, are stiff enough to normally prevent flexing under the thrust forces applied thereto in the gate closing operation, but, in the event that any articles remain between the gates and the bottom of the chamber compartment structure to prevent normal closing of the gates, said straps are capable of flexing so as to permit the cross-arm 122 to complete its downward movement, without forcing the gates 119 to complete their closing movement. This is a safety factor which prevents damage to the mechanism in the event of failure of the articles to be discharged from the compartment.

The closing position of the gates 119 is determined by the seating of the lower end of the connecting member 125 on the upper end of the tubular guide 123b. The member 125 is threaded on the upper end of the rod 123 so that it may be adjusted lengthwise of the rods by rotation of the member 125 on the rod. Suitable shims or washers 125a are interposed between the member 125 and the guide 123 are required, to provide a definite stop at the desired point for the downward movement of the rod 123. The straps 121 are formed of two pieces provided with an adjustable connection such as indicated at 121a to permit adjustment of the length of these straps whereby setting of the closed and open positions of the gates 119 may also be adjusted.

Electrical circuits for the solenoids 17 and 18 are controlled by switches actuated by trippers carried by the conveyor 9 so as to cause dropping of article stacks from the compartments into predetermined receptacles on the conveyor. This solenoid control will hereinafter be explained.

To insure rapid downward movement of the article stacks from the compartments 13 and 14 when the gates 119 thereof are opened, a plunger 127 (see Figs. 2, 3, and 4) is moved downwardly with a quick stroke through an opening in the strap 113 to more or less kick the underlying article stack downwardly. Such a plunger is provided for each compartment and each such plunger is, of course, independently actuated. Each plunger 127 is secured to the armature 128 of a solenoid device (often known as a reciprometer) which embodies an actuating coil or field 129. When this coil is energized, the armature and plunger 127 are moved rapidly downwardly as aforesaid. The armature is guided for very free movement by anti-friction wheels 128a and movement of the armature and plunger is limited by upper and lower stops 130a and 130b respectively which engage abutments provided on the housing of the coil 129. Spring and pulley members 131 return the plunger to its normal retracted position when the coil or field 129 is de-energized. The energizing circuit for the coil or field 129 is connected in parallel with the energizing circuit for the compartment gate operating solenoid 17 or 18, so that said plunger 127 is actuated substantially simultaneously with the opening of the bottom gates of the compartment.

This arrangement for accelerating the movement of the article stacks from the compartments 13 and 14 into the conveyor receptacles makes practical, high speed operation of the conveyor 9 to enable the latter to efficiently handle the output of a plurality of high speed article production machines. It is apparent, of course, that the reciprometer could be arranged to operate the strap 113 in a downward manner to eject the napkins without departing from the invention.

The conveyor unit 9 and associated equipment which control the electrical operating circuits as above mentioned, are best illustrated in Figs. 1, 4, 7, 9a and 9b, 16, 17 and 18.

The conveyor unit 9 comprises a pair of chains 136—136 (Figs. 4, 7 and 17) horizontally mounted in working relation with the delivery sections of each of the article stacking machines, 1 to 8 inclusive and K, these chains being supported for travel by sprockets 137 and 138 located at the opposite end of the assembly line-like arrangement. Sprockets 137 and 138 are mounted on suitably journalled shafts 139 and 140a. Shaft 140a is rotatably supported in bearings mounted on the conveyor supporting frame structure and is driven by movement of the conveyor chain. Suitable drive means (not shown) associated with packaging equipment 11 drives the shaft 139 to thereby drive the conveyor chains at the required speed. The drive means preferably includes a variable speed drive unit so that the speed of the shaft and the conveyor may be varied to suit operating requirements.

A series of saddles 141 are attached to the chains 136 at predetermined intervals along their lengths (Figs. 7, 16 and 17), the saddles being bolted to ears 142 on the chains 136. The saddles 141 are of sufficient width to extend across the operating members mounted beneath the conveyor unit whereby a continuous protective shield is provided to prevent possible damage to such operating members by falling objects. The receptacles or buckets, are seated on and bolted to the tops of said saddles. The receptacles or buckets 10 are here shown as being of U-shaped, sheet metal construction having parallel wall portions 142 and flared upper end portions 143 which cooperate in the manner of a funnel for guiding the stacks of pads into the space between said parallel portions. Each bucket is formed of two separate metal pieces, the back section of each bucket being rigidly attached to the saddle 141 and the forward section being adjustable along the conveyor length toward and away from the stationary back section whereby various size pads and tissues may be conveniently handled by the conveyor. Converging side wall portions 144 are formed on one end of the bucket, as an aid to the operation of the packaging machinery 11.

The conveyor is equipped with a plurality of sets of buckets, each set consisting of sixteen buckets in this instance, and each bucket in each set being assigned to convey the output of a specific one of the storage compartments 13 and 14 of a specific one of the stacking machines, 1 to 8, inclusive. The number of bucket sets is not related to the number of stacking machines but is merely the number of sets, which will take up the length of the conveyor needed to serve all of the stacking machines and to deliver the stacks to the packing machine. As shown in Fig. 1, eight buckets numbered 1E to 8E, inclusive, are assigned to carry the contents delivered by storage compartments 13 on each of the machines 1 to 8, respectively, and the succeeding eight buckets 1W to 8W are operative to receive the contents delivered by the storage compartments 14 on each of the machines, 1 to 8 respectively. Bucket 1E receives the output of compartment 13 of machine 1; bucket 1W receives the output of compartment 14 of machine 1.

The opening of the gates 119 on each of the storage compartments to deposit the napkin stacks into its preassigned bucket 10 is effected by tripping unit or trigger cam 16 mounted on the underside of the saddle unit 141 of each bucket (see Figs. 4, 16 and 17), said trigger cam operating the mechanism in the associated one of the switch actuating units 15a or 15b to close an electric switch which controls the circuit of the associated solenoids 17 and 18 and the plunger motor coils 129.

Each unit 16 comprises a mounting body 145, which is bolted as indicated at 145a to the underside of the saddle 141, and a laterally projecting cam projection 146. There is a cam unit 145—146 for each conveyor bucket and the cam which controls deposition of articles in one bucket, depends from the saddle of a different bucket.

The switch mechanisms 15a and 15b are of like construction. Each comprises a body or frame structure 150 which is suitably fastened to the conveyor frame 140 (see Figs. 16 and 17), preferably in such a manner that said body 150 may be readily adjusted lengthwise of the conveyor. The plate portion of the body 150 is provided with a depending boss 151, which is bored out to slidably receive a sleeve 152 in which a shaft 153 is journalled. The sleeve 152 is adjustable to various vertical positions responsive to adjustment of the bolt 154 which is freely rotatable in an ear 155 of said sleeve, and threaded through an ear 156 of said boss 151. A lock nut may be provided on the bolt for locking the same against undesired adjustment. The shaft 153 protrudes beyond the lower end of the sleeve 152 to receive one end of an arm 158 and the hub portion of an operating arm 159. The shaft member 153 is anchored against vertical movement in the sleeve 152 by a head on the upper end of the shaft, and by the end portion of the arm 158 which is pinned or otherwise fixed on the lower end of said shaft. The free end of the arm 158 is provided with a cylindrical boss bored to receive a pair of ball bearings 160—160, in which a tappet member 161 is mounted for free rotation. The upper end of the tappet 161 is in the form of a circular head 162 of substantially the same thickness as that of the adjusting bolt 154 in the plane of one of the tripping cam projections 146 by which the arm 158 is to be rocked.

When the tappet head 162 is engaged by a cam projection 146, the shaft 153 will be rocked; the arm 159 which, like the arm 158, is pinned to the shaft 153 will also be rocked so as to cause the end portion 163 of said arm 159 to engage and operate the control member 164 of a suitable electric switch 165, whereby an electric circuit is completed to energize the electrical devices which effect deposition of the article stacks in the conveyor buckets. A spring 166 stretched between the other end of the lever 159 and an anchor carried by the frame or body 150 returns the lever to normal position to allow the switch to open after remaining closed only for the short period of time during which the tappet head is in engagement with the cam projection 146. A stop screw 167 adjustably carried by the body 150 in position to engage the lever 159, determines the normal position of said lever.

The switch units 15a and 15b are located at conveniently accessible positions along the conveyor. The units 15a and 15b of each pair are also respectively associated with the opposite sides of the conveyor, the unit 15a represented in dotted lines in Figure 17, being associated with the stacking machine side of the conveyor, and the unit 15b, shown in full lines in Figure 17, being associated with the opposite or outside of the conveyor. The cams 146 which actuate the switch unit 15b accordingly project toward the outside of the conveyor as shown in Figure 17, and the corresponding cams which actuate the inside switch unit 15a will, of course, project inwardly of the conveyor. Similarly, the pivoted arm 158 of the switch unit 15b will be left-handed in its relation to the arm 158 of the unit 15a, if the latter is considered right-handed.

In operation, when the stack of napkins in the compartment 13 of machine No. 2 (Fig. 1) is to be deposited in the bucket marked 2e, the switch 165 in switch unit 15b must be closed so as to cause opening of the gates of the compartment 13 when the bucket 2e is in about the relationship to the compartment 13 indicated in Fig. 1. Hence, the trigger cam 146 for effecting deposition of a stack of napkins into the bucket 2e from the compartment 13 of machine No. 2 is carried by the saddle of a preceding bucket, in this instance the saddle of the bucket marked 7w. Such arrangement is employed because of the preferred location of the switch unit as already explained.

As another example, bucket No. 1w is illustrated as having been filled with a stack of napkins, which were transferred to the bucket from compartment 14 of machine No. 1. The gates of compartment 14 of machine No. 1 were opened by closing the contacts of the associated switch unit 15a by means of the trigger cam carried by the preceding bucket marked 6e.

The trigger cams 146 which actuate the switch mechanism 15a and 15b for machine No. 2 are disposed in the same horizontal plane as represented by the cams 146 of the cam units 2e and 2w in Fig. 9a. These cams of the units 2e and 2w project in opposite directions, however, as indicated in Fig. 9b, so that they are adapted to cooperate with the respective right-hand and left-hand arm arrangements of the switch mechanisms. The cams 146 which control the discharge of napkin stacks from the machine No. 1 are arranged in a different horizontal plane than those which control the discharge of napkins from machine No. 2 so that the cams from machine No. 1 will not engage the switches for machine No. 2 or any of the other machines. This is represented by the cams 146 of the cam units 1e and 1w in Fig. 9a which are illustrated as being in a plane above the plane of the cams of the units 2e and 2w.

Similarly the two (2) cams 146 for each stacking machine unit are in a horizontal plane different from each of the other pairs of control cams. Correspondingly, the tappet heads 162 of the respective pairs of switch mechanisms are disposed in various planes vertically offset relative to each other to correspond to the planes of their respective actuating cams 146.

The conveyor 9 embodies a plurality of full sets of sixteen buckets, one for each compartment of each of the eight machines which normally deliver their products to the conveyor. The buckets are uniformly spaced lengthwise of the conveyor so as to provide regularity of operation, but there is no necessary relationship between the spacing of the buckets on the conveyor and the spacing of the compartments 13 and 14 of the stacking machines or the spacing of the machines relative to each other. For example, in the illustrated arrangements, the center to center distance of the compartments 13 and 14 of each stacking machine is somewhat greater than the center to center distance of the conveyor buckets.

It is entirely possible that the compartment 14 of any two or more of the eight machines may simultaneously discharge their article stacks into conveyor buckets passing thereunder and also that these compartments 14 may be out of synchronization with each other so that each one discharges its stack of napkins at a different time. Similarly, there is no necessary relationship between the discharging of the stacks from the compartments 13 of the machines. Hence, one or more of the stacking machines may operate somewhat faster or slower than another without affecting or impairing the operativeness of the entire system.

Because of the variation in the speed of operation of the various stacking machines, it is not practical to adopt a standard synchronized relationship between the conveyor and any one of the stacking machines. Instead, the conveyor is driven at a speed whereby an excess number of buckets will be presented to each stacking machine per unit of time. For example, if the stacking machines were to produce 10 stacks of napkins per minute, each storage compartment would handle 5 such stacks per minute and the conveyor would be so constructed and operated as to present 7 or 8 buckets per minute to each storage compartment. By presenting an excess number of buckets to each storage compartment per unit of time, it is entirely practical to deliver to predetermined buckets or receptacles on a single conveyor, the output of article production and stacking machines which operate at different production speeds. The conveyor should, of course, operate at a speed whereby an excess number of buckets are presented to the fastest operating production machine so that some leeway is provided whereby the speed of operation of the fastest machine may be increased when possible without requiring changes in the operation of the conveyor.

When the conveyor 9 is driven at speeds around 90 feet per minute, it is advantageous that the article stack be caused to move downwardly at fairly high speed in order that it will properly enter the receiving bucket. For that reason the stack is more or less kicked downwardly by the reciprocating arrangement previously described which is actuated simultaneously with the opening of the bottom gates 119 of the respective compartments. The upper portions of the bucket walls are flared out substantially as indicated so as to permit the bottom of a stack to be guided into the bucket even though the bottom reaches the top plane of the bucket before the bucket is vertically aligned with the descending stack. Similarly the flared part of the trailing wall of the bucket helps materially to guide the upper part of the stack into the bucket even though the said upper part of the stack is moved downwardly in horizontally rearwardly offset relation to the main body portion of the bucket.

Automatic high speed equipment for producing various articles including sanitary napkins, and for accumulating the same in stacks of twelve (12) or any other predetermined number, occasionally requires shutting down for adjustment, cleaning, or other purposes. In order to permit such shutting down of one machine without correspondingly reducing the successive packing operations, it is convenient to provide a standby or key unit of article producing and stacking mechanism such as is represented in this instance by the unit of mechanism designated "K" in Fig. 1. The stacking mechanism is identical in all material respects with that of the units 1 to 8 as already described. The switch mechanisms designated 17a and 17b in Fig. 1 are similar to those represented at 15a and 15b. However, the mechanisms 17a and 17b are modified to permit adjustment of the vertical positions of their tappet heads 162 whereby the tappet heads 162 of these switch units 17a and 17b may be adjusted to the same elevation as the tappet heads of the switch unit for any machine of the series 1 to 8 which may be shut down. Hence, when required, the standby machine "K" may be put into production to take the place of any one of the machines 1 to 8 when any of the latter are shut down.

Details of the adjustable switch mechanism 17a and 17b are shown in Figs. 12 to 15 inclusive. As shown in these figures, parts which correspond in function to those shown in Figs. 16, 17 and 18 are designated by the same reference numbers but with an exponent "k."

In the modified arrangement, means are provided for more readily vertically adjusting the sleeve 152k and the elevation of the tappet head 162k than is provided in the standard structure of Fig. 16 for adjusting the sleeve 152 and tappet head 162. In the special structure represented in Figs. 12 to 15, the sleeve 152k is provided with gear teeth 170 which engage the teeth of a gear 171 which is secured to an axially horizontal shaft 172. The shaft 172 is journaled in bearings carried by the boss 151k, and said shaft 172 extends outwardly of the conveyor structure as indicated in Figs. 13 and 14 and is provided on its outer end with a crank arm 173 whereby the shaft may be manually rotated. Manual rotation of this shaft 172 will of course serve to rotate the gear 171 and thereby to adjust the sleeve 152k up or down in accordance with the direction in which the gear is turned. The crank 173 has a handle 174 which carries a spring-pressed plunger 175 and the latter is adapted to enter any one of a series of eight index holes 176 provided in a stationary index plate 177.

There are nine holes 176, eight of which are respectively related to the napkin producing and stacking machines 1 to 8 inclusive. By adjusting the crank arm 173 to position the locking pin 175 in one of the 8 holes related to the machines 1 to 8 inclusive, the tappet head 162k will be adjusted to the level of the cam 146 which is related to the machine whose place is to be taken by the standby or key machine. In Fig. 14, the tappet head 162k is illustrated in full lines in its uppermost position in which it is horizontally aligned with the cam 146 which is related to stacking machine No. 1. Said tappet head 162k may, however, be adjusted downwardly into alignment into any one of the other 7 cams 145 which are illustrated in dotted lines. Furthermore, said tappet head 162k may be adjusted to its lowermost position, represented also in dotted lines, in which it is in an inoperative position below the level of the lowermost cam 145. Hence when the regular machines 1 to 8 are in normal operation the stand-by machine and its switch mechanisms will be inoperative and idle. The ninth hole 176 is the position of the adjusting handle 173 when the tappet head 162k is adjusted to its lowermost or inoperative position.

The ends of the switch actuating lever 159k in the special switch mechanisms, are provided with vertically extending cross-pieces 178 and 179 (Figs. 12, 13 and 14) which are respectively engageable with the switch buttons 164k and stop pins 167k in all of the vertically adjusted positions of the lever 159k except that the crosspiece 178 is not engageable with the switch button in the lowermost position of adjustment of the lever 159k.

The electrical circuit for controlling the gates 119 of the compartments 13 and 14 is shown in Fig. 10. The solenoids 17 and 18 which open the gates 119 are supplied with suitable current from a line 180 through time-delay relays 181 which are operative to maintain the respective gates open for a predetermined time interval to permit a stack of pads to drop out of the compartment. The time-delay relays 181 are controlled by windings 182 which are energized from a power supply line 183 one side of which leads to the winding 182 through the switches 165 and 186 of the respective switch units. The switches 165 are preferably of a type which require but little movement of its operating button to complete the required electrical circuit.

If desired, a manually operable control switch 184 may be provided in each relay circuit to permit an operator or attendant of the machine, to prevent energization of the relay 181 when, because of the presence of a defect in one of the articles of the stack, or for any other reason, it is desired to prevent dropping of a selected stack of articles to the conveyor. The switches 184 are normally closed and would be opened only to prevent the dropping of the selected stack of articles. In the event that a stack of articles is not dropped, the next stack of articles fed into the unemptied compartment will engage the undischarged stack and force it forwardly out of the front or outer end of the compartment, this being permitted by the hinged mounting of the end member 117a (Fig. 4). As soon as the unwanted stack is removed the hinged plate 117a will swing back to its normal position as shown in Fig. 4. The unwanted stack of articles may be conducted by suitable chutes to any point of disposal, or it may be permitted to drop immediately into a receptacle (not shown) positioned for that purpose immediately beyond the outer end of each compartment 13 and 14.

It is also generally desirable to provide means for preventing opening of the gates 119 during the time that a stack of articles is being moved from one of the magazines 62 or 63 into one of the storage compartments 13 or 14. If the gates 119 were opened during the delivery of a stack of articles into a magazine the stack would tend to tilt and fall through the then open bottom of the compartment in a disorganized arrangement which might cause jamming of the equipment. To that end rotary cam controlled safety switches 185 are incorporated in the electrical circuits of the relay windings 182, these switches being normally closed but automatically opened during the time that the plungers 110, advance stacks of articles from the magazines into the storage compartments. The safety switches 185 are actuated by a pair of rotary cams 186 which are carried by the shaft 187 (Fig. 2) of an auxiliary unit of mechanism 188. This auxiliary unit 188 is driven in predetermined timed relation to the operation of the plungers 110 through the agency of a chain drive 189 which is connected ot the drive shaft 29 of the stacking machine. The cams 186 are so timed that when the plungers 110 are moved forwardly the circuits to the relay windings are opened. The circuits, are of course, re-closed as soon as the delivery of the articles has been completed so that as soon as a proper bucket approaches receiving position relative to the compartment in question, the circuit may be closed by closing of the conveyor actuated switch 165 as already explained. As indicated in Fig. 10, the cams 186 for the switches 185 are positioned substantially 180° apart so as to affect the gate operation circuit for only the compartment which is receiving a stack of articles. This control of the gate operating circuit also serves to prevent energizing of the reciprocomotors 129, during movement of stacks of articles into respective compartments.

The described mechanism, including the described relationship of the production and stacking machines and receiving conveyor, is a very efficient arrangement in that it does not require any carefully timed operating relationship between the associated production and stacking machines and even permits the latter to operate at different production speeds without impairing operativeness of the entire assembly. Although provision has been explained for maintaining the delivery to the conveyor of the output of a predetermined number of production machines, the mechanism is operative with a lesser number of production units so that one or more of the production units may be shut down while the others continue to operate. Hence, if the required volume of production should be substantially less than the full production permitted by the described arrangement, the apparatus is flexible enough to permit operation of only selected portions of the entire number of production units and the conveyor for delivering the articles to packaging mechanism.

Various changes in the described structure may be made while retaining the principles of the invention.

We claim:

1. In combination, a plurality of machines each operative to receive articles from a continuously moving supply and arrange same in stacks of predetermined number, each of said machines having a pair of stack receiving compartments each provided with a displaceable bottom gate for supporting the stack in the compartment, a conveyor having a reach movable through a path extending under said compartments, a plurality of sets of receptacles carried by said conveyor through article-stack receiving positions under said compartments, each of said sets of receptacles being assigned to receive stacked articles from a certain one of said plurality of machines, a plurality of sets of cam elements carried by said conveyor and respectively associated with said sets of receptacles, said sets of cam elements being movable through relatively offset paths of travel, and a plurality of devices respectively operably connected with the gates of said machines and each projecting into a different one of said paths of travel of said cam elements so as to be engageable only by the elements of one set thereof, said devices being activated as an incident to engagement by said cam elements to effect displacement of said gates so as to permit discharge of stacked articles from said compartments to the receptacles of a predetermined set thereof.

2. In combination, a plurality of machines each operative to receive articles from a continuously moving supply and arrange the same in stacks of a predetermined number, each of said machines having a pair of stack receiving compartments each provided with a displaceable bottom gate for supporting the stack in the compartment, a conveyor having a reach movable through a path extending under said compartments, a plurality of sets of receptacles carried by said conveyor through article-stack receiving positions under said compartments, each of said sets of receptacles being assigned to receive stacked articles from a certain one of said plurality of machines, a plurality of sets of cam elements carried by said conveyor and respectively associated with said sets of receptacles, said sets of cam elements being movable through relatively offset paths of travel, a plurality of devices respectively operably connected with the gates of said machines and each projecting into a different one of said paths of travel of said cam elements as to be engageable only by the elements of one set thereof, said devices being activated as an incident to engagement by said cam elements to effect displacement of said gates so as to permit discharge of stacked articles from the said compartments to the receptacles of a predetermined set thereof, and means, actuated as an incident to activation of said devices, for accelerating the movement of said articles stacks from said compartments to said conveyor.

3. In combination, a plurality of machines each operative to receive and stack sanitary napkins in stacks of a predetermined number, each of said machines having a stack receiving compartment provided with a displaceable bottom gate for supporting the stack in the compartment, and electrically operable means for displacing said gate, a conveyor having a reach movable through a path extending under said compartments, a plurality of sets of receptacles carried by said conveyor through napkin-stack receiving positions under said compartments, each of said sets of receptacles being assigned to receive stacked napkins from a certain one of said plurality of machines, a plurality of sets of cam elements carried by said conveyor and respectively associated with said sets of receptacles, said sets of cam elements being movable through relatively offset paths of travel, and a plurality of electric switches respectively connected to said electrically operable gate displacing means, each of said switches having an operating member projecting into a different one of said paths of travel of said cam elements so as to be engageable only by the elements of one set thereof, said switches being operative to complete an electric circuit for the gate displacing means to which the switch is connected, whereby said gate displacing means are energized so as to permit discharge of stacked napkins from said compartments to the receptacles of a predetermined set thereof.

4. In combination, a plurality of machines operative to receive articles from a continuously moving supply and stack said articles in stacks of a predetermined number, each of said machines having a pair of discharge compartments alternately receiving said stacks and from which the stacked articles are automatically discharged, a continuously operating conveyor arranged to receive the stacks discharged from said compartments, a supporting frame for said conveyor, a plurality of cam members respectively mounted on said conveyor for travel therewith in different paths of travel, a series of electric switches fixedly mounted on said conveyor frame, each of said switches being arranged to control one of said discharge compartments, and operating means for each of said switches, each of said operating means having a member disposed in the line of travel of one of said cam members so as to be thereby operated to effect operation of its associated switch and discharge compartment.

5. In combination, a plurality of machines operative to receive and stack sanitary napkins in stacks of a predetermined number, each of said machines having a discharge compartment from which the stacked napkins are automatically discharged, a continuously operating conveyor arranged to receive the napkin stacks discharged from said compartments, a supporting frame for said conveyor, a plurality of cam members respectively mounted on said conveyor for travel therewith in different paths of travel, a series of electric switches fixedly mounted on said conveyor frame, each of said switches being arranged to control the discharge compartment of a different one of said machines, and operating means for each of said switches, each of said operating means comprising an arm mounted at one end for pivotal movement, a tappet carried by said arm, said tappet having a circular head engageable by one of said cam members for effecting rocking of said arm, and said arm having a part engageable with one of said switches to actuate the same.

6. In combination, a plurality of machines operative to receive and stack sanitary napkins in stacks of a predetermined number, each of said machines having a discharge compartment from which the stacked napkins automatically discharged, a continuously operating conveyor arranged to receive the napkin stacks discharged from said compartments, a supporting frame for said conveyor, a plurality of cam members respectively mounted on said conveyor for travel therewith in different paths of travel, a series of electric switches fixedly mounted on said conveyor frame, each of said switches being arranged to control the discharge compartment of a different one of said machines, and operating means for each of said switches, each of said operating means comprising an arm mounted at one end for rocking movement in one direction and for adjustment in a direction transverse to the direction of said rocking movement, means for locking said arm in the selected position of transverse adjustment, the free end of said arm being engageable by one of said cam members for effecting rocking of said arm, and said arm having a part engageable with one of said switches to actuate the same.

7. In combination, a plurality of machines operative to receive and stack sanitary napkins in stacks of a predetermined number, each of said machines having a discharge compartment from which the stacked napkins are automatically discharged, a continuously operating conveyor arranged to receive the napkin stacks discharged from said compartments, a supporting frame for said conveyor, a plurality of cam members respectively mounted on said conveyor for travel therewith in different paths of travel, a series of electric switches fixedly mounted on said conveyor frame, each of said switches being arranged to control the discharge compartment of a different one of said machines, and operating means for each of said switches, each of said operating means comprising an arm mounted at one end for rocking movement in one direction and for adjustment in a direction transverse to the direction of said rocking movement, manually operable indexing means for effecting adjustment of said arm in said transverse direction and operative to lock said arm in selected position of such adjustment, the free end of said arm being engageable by one of said cam members for effecting rocking of said arm, and said arm having a part engageable with one of said switches to actuate the same.

8. In combination, a plurality of machines normally operative to receive and stack sanitary napkins in stacks of a predetermined number, and to discharge said stacks, a conveyor arranged to receive said stacks from all of said machines and having a plurality of sets of receptacles, each of said sets of receptacles being keyed to one of said machines to receive said stacks from only the machine to which the set is keyed, a normally idle stand-by machine which is also operative to receive and stack sanitary napkins as aforesaid and to discharge said stacks to said conveyor, means associated with said conveyor for causing said plurality of normally operative machines to discharge their stacks to the receptacles of the sets thereof which are keyed to the respective machines, and additional means also associated with said conveyor for causing said stand-by machine to discharge said stacks to the receptacles of any selected set thereof, said additional means being adjustable to key said stand-by machine to any selected set of receptacles whereby said stand-by machine may be selectively substituted for any one of the machines of said plurality of normally operative machines.

9. In combination, a plurality of machines normally operative to receive and stack sanitary napkins in stacks of a predetermined number, said machines being keyed to said conveyor so as to deliver said stacks to said conveyor, each delivering said stacks exclusively to a predetermined area on said conveyor, a normally idle stand-by machine which is also operative to receive and stack sanitary napkins as aforesaid and to discharge said stacks to said conveyor, means associated with said conveyor for causing said plurality of normally operative machines to discharge their stacks to their respective areas of said conveyor, and additional means also associated with said conveyor for causing said stand-by machine to discharge said stacks to the areas normally supplied by any selected one of said plurality of machines, said additional means being adjustable to key said stand-by machine to any one of said predetermined areas on said conveyor whereby said stand-by machine may be selectively substituted for one of the machines of said plurality of normally operative machines.

10. In combination, a plurality of article stacking machines each having a storage compartment to which stacks of a predetermined number of said articles are delivered, a gate forming the bottom of said storage compartment, a reciprocating plunger movable downwardly into said storage compartment, a continuously operating conveyor having a series of receptacles mounted at predetermined intervals along its length, each of said receptacles being assigned to receive and convey the contents of a predetermined one of the storage compartments of said machines, a frame supporting said conveyor, a plurality of trips on said frame, each of which is operably connected with the gate and plunger of a predetermined one of said storage compartments to effect an opening of said gate and a downward, article-discharging movement of said plunger, and means on each of said receptacles which is movable into engagement with a predetermined one of said trips to actuate the latter and thus operate the related gate and plunger.

11. In combination, a plurality of article stacking machines each having a storage compartment to which stacks of a predetermined number of articles are delivered, a gate forming the bottom of said storage compartment, means for operating said gate comprising a solenoid unit and linkage connecting said solenoid unit to said gate, an electrically actuated reciprocating plunger in said storage compartment movable downwardly into engagement with said stack of articles to accelerate movement thereof through said gate when the latter is open, a continuously operating conveyor having a series of receptacles mounted at intervals along its length, each of said receptacles being assigned to receive and convey the contents of a predetermined one of the stacking machines, a frame supporting said conveyor, an operating circuit for the solenoid and plunger associated with each of said stacking machines, a plurality of trip switches on said conveyor frame, each controlling a particular one of said operating circuits, and means on each of said receptacles for movably engaging a predetermined one of said trip switches to thereby render the related circuit operative to energize the related solenoid unit and open said gate and to move the related plunger downwardly in the storage compartment.

12. In combination, a plurality of article stacking machines each having a storage compartment to which stacks of a predetermined number of articles are delivered, a gate forming the bottom of said storage compartment, means for operating said gate comprising a solenoid unit and linkage connecting said solenoid unit to said gate, an electrically actuated reciprocating plunger in said storage compartment movable downwardly into engagement with said stack of articles to accelerate movement thereof through said gate when the latter is open, a continuously operating conveyor having a series of receptacles at intervals along its length, each of said receptacles being assigned to receive and convey the contents of a predetermined one of the stacking machines, a frame supporting said conveyor, a plurality of cam members respectively mounted on said conveyor for movement therewith in different paths of travel, an operating circuit for the gate controlling solenoid and plunger of each of said stacking machines, a series of electric switches fixedly mounted on said conveyor frame, each of said switches being arranged to control one of said operating circuits, and operating means for each of said switches mounted, respectively, on said conveyor frame in the line of travel of one of said cam members.

13. Apparatus for receiving articles from a plurality of manufacturing devices, which are independently controllable in their speed of operation comprising, a plurality of machines operative to receive said articles from said manufacturing devices and to arrange said articles in stacks of a predetermined number, a pair of storage compartments on each of said machines for alternately receiving one of said stacks, a gate forming the bottom of each of said storage compartments, means for operating said gate comprising a solenoid unit and linkage connecting said solenoid unit to said gate, a continuously operating conveyor having a series of receptacles at intervals along its length movable through a path underlying said compartments, a frame supporting said conveyor, a plurality of cam members respectively mounted on said conveyor for travel therewith in different paths of travel, an operating circuit for each of said solenoids, a series of electric switches fixedly mounted on said conveyor frame, each of said switches being arranged to control one of said operating circuits, and operating means for each of said switches mounted, respectively, on said conveyor frame in position for engagement by one of said cam members.

14. In combination, a plurality of machines, each of said machines embodying electrically actuated article discharging means, a conveyor assembled in such working relation to said machines as to be operative to receive the articles from said discharging means, said conveyor embodying a stationary supporting frame and a travelling member mounted on said frame and provided with a plurality of receptacles respectively assigned to receive articles from certain of said machines, a plurality of electric switches on said frame and respectively connected to said electrically actuated discharging means to control the operation thereof, and a plurality of trips secured to said conveyor in positions to actuate the discharge control switches of predetermined machines when the respective assigned receptacles are in receiving position relative to the machine.

15. In combination, a plurality of machines, each of said machines embodying electrically actuated article discharging means, a conveyor assembled in such working relation to said machines as to be operative to receive the articles from said discharging means, said conveyor embodying a stationary supporting frame and a travelling member mounted on said frame and provided with a plurality of receptacles respectively assigned to receive articles from certain of said machines, a plurality of electric switches on said frame and respectively connected to said electrically actuated discharging means to control the operation thereof, and a plurality of trips secured to said conveyor in positions to actuate the discharge control switches of predetermined machines when the respective assigned receptacles are in receiving position relative to the machine, the switches and trips for each co-operating machine and receptacle being located at points spaced lengthwise of the conveyor from the respectively controlled discharging means.

16. The combination of apparatus for performing an operation on each of a succession of articles delivered to such apparatus, a machine for delivering successive articles and having storing means for successively receiving and temporarily storing the successive articles, said apparatus and said machine being driven independently of and without synchronization of their drives to each other, a conveyor provided with a plurality of receptacles for receiving said articles from said storing means and delivering said articles successively to said first mentioned apparatus, and means propelling said conveyor at a speed to present in article receiving position, a greater number of receptacles per predetermined unit of time than there are articles delivered to said storing means per said unit of time, whereby said conveyor is operative to receive and conduct to said apparatus, the entire output of said machine and said apparatus is operative as aforesaid notwithstanding variation in the rate of said output.

17. The combination of apparatus for performing an operation on each of a succession of stacks of articles delivered to such apparatus, a machine for delivering articles one by one and having means for collecting the same into successive stacks which contain predetermined numbers of said articles, stack receiving and storing means for successively receiving the stacks from said stack collecting means, said apparatus and said machine being driven independently of and without synchronization of their drives to each other, a conveyor provided with a plurality of receptacles for receiving said stacks from said storing means and delivernig said stacks successively to said apparatus, and means propelling said conveyor at a speed to present in stack receiving position, a greater number of receptacles per unit of time than there are stacks collected and stored per said unit of time, whereby said conveyor is operative to receive and conduct to said apparatus, the entire output of said machine and said apparatus is operative as aforesaid notwithstanding variation in the rate of said output.

18. The combination of apparatus for performing an operation on each of a succession of stacks of articles delivered to such apparatus, a plurality of machines, each operative to deliver articles one by one and each having means for collecting said articles into successive stacks which contain predetermined numbers of said articles, a plurality of stack receiving and storing devices respectively associated with said machines for successively receiving said stacks from said collecting means of the respective machine, and a conveyor provided with a plurality of sets of receptacles for receiving said stacks from said storing devices and delivering said stacks successively to said apparatus, each of said sets of receptacles comprising as many receptacles as there are storing devices and the receptacles of each set being respectively assigned to receive article stacks from a certain one of said devices, and means propelling said conveyor at a speed to present in stack receiving position relative to each of said storing devices, a greater number of receptacles per unit of time than there are stacks collected and stored per said unit of time in the respective devices, whereby said conveyor is operative to receive and conduct to said apparatus the entire output of all of said machines, said apparatus being driven independently of said machines and at a higher speed than and without synchronization to the drive of said machines so as to be capable of successively performing its function on the article stacks delivered by all of machines.

19. The combination of apparatus for performing an operation on each of a succession of stacks of articles delivered to said apparatus, a plurality of machines, each operative to deliver articles one by one and having a pair of article receiving compartments alternately operative to collect stacks of articles containing predetermined numbers of said articles, a plurality of stack receiving and storing devices respectively associated with said machines, said devices each comprising a pair of compartments respectively associated with the stack collecting compartments of the respective machines and operative to receive the collected stacks from said compartments, and a conveyor provided with a plurality of sets of receptacles for receiving said stacks of articles from said storing devices and delivering said stacks successively to said apparatus, each of said sets of receptacles comprising as many receptacles as there are stack storing compartments, the receptacles of each set being respectively assigned to receive stacks from said storing compartments, and means propelling said conveyor at a speed to present in stack receiving position relative to each of said storing compartments, a greater number of receptacles per predetermined unit of time than there are stacks received by said storage compartments per said unit of time, said conveyor being operative to receive and conduct to said apparatus, the entire output of all of said machines, said apparatus being actuated independently of said machines without synchronization with the latter and at a speed sufficient to enable said apparatus to perform its function successively on all of the article stacks delivered to said apparatus by said conveyor.

20. The combination of apparatus for performing an operation on each of a succession of articles delivered to such apparatus, a plurality of machines, each operative to deliver successive articles and each having storing means for successively receiving and temporarily storing the successive articles, said apparatus and said machines being driven independently of and without synchronization of their drives to each other, a conveyor provided with a plurality of receptacles for receiving said articles from said storing means and delivering said articles successively to said first mentioned apparatus, and means propelling said conveyor at a speed to present in article receiving position, a greater number of receptacles per predetermined unit of time than there are articles delivered to said storing means per said unit of time, whereby said conveyor is operative to receive and conduct to said apparatus, the entire output of said plurality of machines and said conveyor and apparatus are operative as aforesaid notwithstanding variation in the rate of output of any of said plurality of machines.

21. The combination of apparatus for performing an operation on each of a succession of articles delivered to such apparatus, a plurality of machines, each operative to deliver articles one by one and each having storing means for successively receiving and temporarily storing the successive articles, a plurality of article receiving and storing devices respectively associated with each of said machines for successively receiving said articles from said storing means of the respective machines, and a conveyor provided with a plurality of sets of receptacles for receiving said articles from said storing devices and delivering said articles successively to said apparatus, each of said sets of receptacles comprising as many receptacles as there are storing devices and the receptacles of each set being respectively assigned to receive articles from a certain one said devices, and means propelling said conveyor at a speed to present in article receiving position relative to each of said storing devices, a greater number of receptacles per unit of time than there are articles delivered per said unit of time to the respective storing devices, whereby said conveyor is operative to receive and conduct to said apparatus the entire output of all of said machines, said apparatus being driven independently of said machines and at a higher speed than and without synchronization to the drive of said machines so as to be capable of successively performing its function on the articles delivered by all of machines.

References Cited in the file of this patent

UNITED STATES PATENTS

| Number | Name | Date |
| --- | --- | --- |
| 1,425,556 | Tingwall et al. | Aug. 15, 1922 |
| 1,708,686 | Thompson | Apr. 9, 1929 |
| 1,858,619 | Delamere | May 17, 1932 |
| 2,254,291 | Joa | Sept. 2, 1941 |
| 2,296,802 | Thompson | Sept. 22, 1942 |
| 2,415,941 | Edson et al. | Feb. 18, 1947 |
| 2,441,469 | Cameron | May 11, 1948 |
| 2,498,071 | Dalziel et al. | Feb. 21, 1950 |
| 2,568,248 | Nichols et al. | Sept. 18, 1951 |